United States Patent [19]

Dunn et al.

[11] Patent Number: 4,838,154
[45] Date of Patent: Jun. 13, 1989

[54] APPARATUS FOR EXTENDING THE SHELF LIFE OF FLUID FOOD PRODUCTS

[75] Inventors: Joseph E. Dunn, Rancho LaCosta; Jay S. Pearlman, San Diego, both of Calif.

[73] Assignee: Maxwell Laboratories, Inc., San Diego, Calif.

[21] Appl. No.: 51,841

[22] Filed: May 18, 1987

Related U.S. Application Data

[62] Division of Ser. No. 740,004, May 31, 1985, Pat. No. 4,695,472.

[51] Int. Cl.⁴ ............................................... A23L 3/32
[52] U.S. Cl. ........................................ 99/451; 99/483
[58] Field of Search ................ 99/451, 483, 516, 536; 422/22, 23; 426/237, 238, 521; 219/291, 288, 295

[56] References Cited

U.S. PATENT DOCUMENTS

| | | |
|---|---|---|
| 1,900,509 | 3/1933 | Louder . |
| 1,934,704 | 11/1933 | Golden ................................ 99/451 X |
| 2,428,328 | 9/1947 | Ham et al. . |
| 2,428,329 | 9/1947 | Ham et al. . |
| 2,637,408 | 5/1953 | Yadoff .................... 422/22 |
| 3,095,359 | 6/1963 | Heller . |
| 3,265,605 | 8/1966 | Doevenspeck . |
| 3,594,115 | 7/1971 | Wesley et al. . |
| 4,434,357 | 2/1984 | Simpson et al. .................... 219/291 |
| 4,457,221 | 7/1984 | Geren .................... 99/451 |
| 4,522,834 | 6/1985 | Miyahara .................... 426/231 |
| 4,572,775 | 2/1986 | Paniagua . |
| 4,608,920 | 9/1986 | Scheglov et al. .................... 99/451 |
| 4,612,199 | 9/1986 | Miyahara .................... 426/237 |

Primary Examiner—Timothy F. Simone
Attorney, Agent, or Firm—Fitch, Even, Tabin & Flannery

[57] ABSTRACT

Methods and apparatus for preserving fluid food products by subjecting the fluid foodstuffs such as diary products, fruit juices and fluid egg products to controlled, pulsed, high voltage electric field treatment. The methods and apparatus further contemplate the utilization of treatment for storage temperature control in the preservation of perishable fluid foodstuffs.

7 Claims, 10 Drawing Sheets

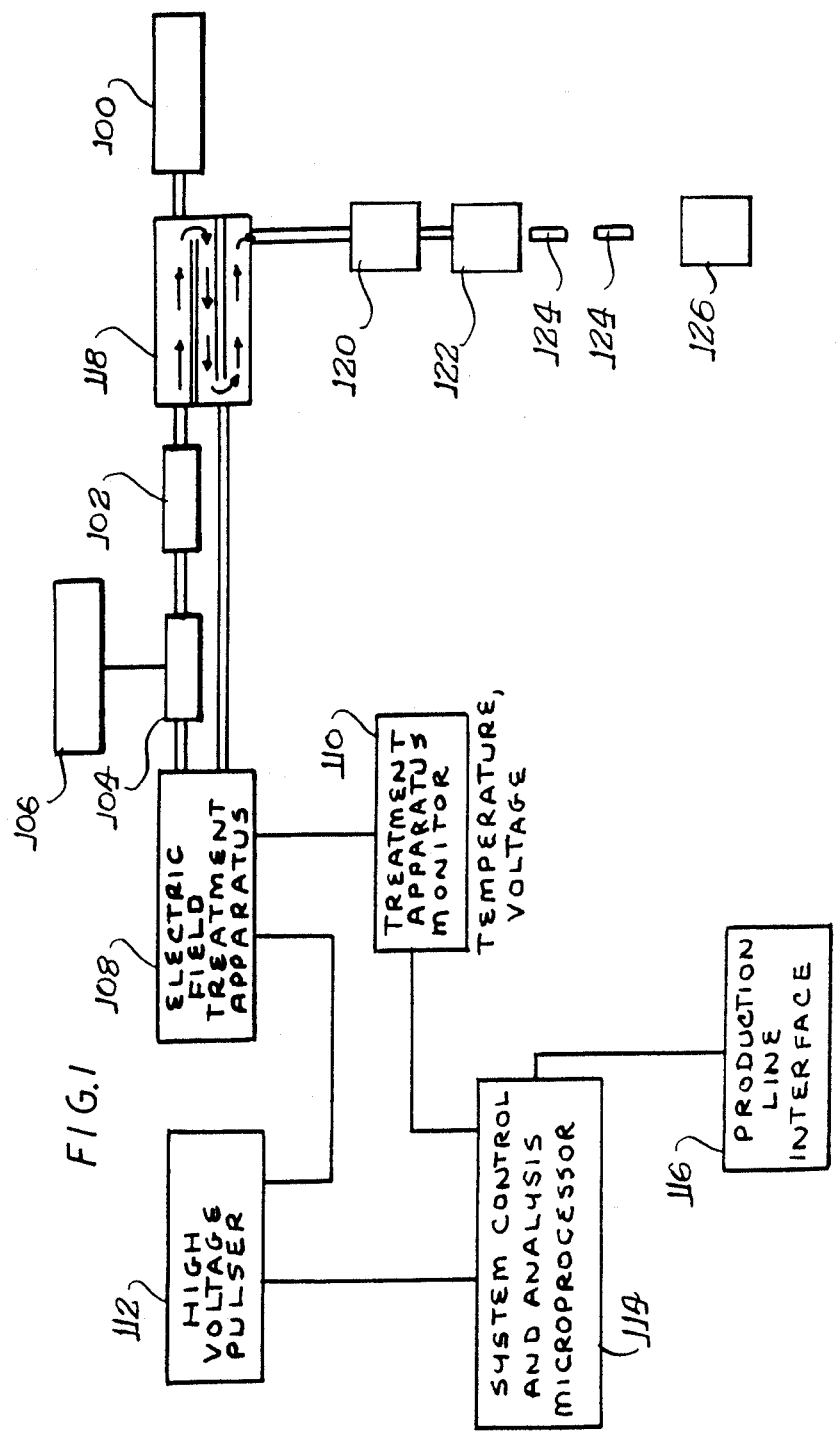

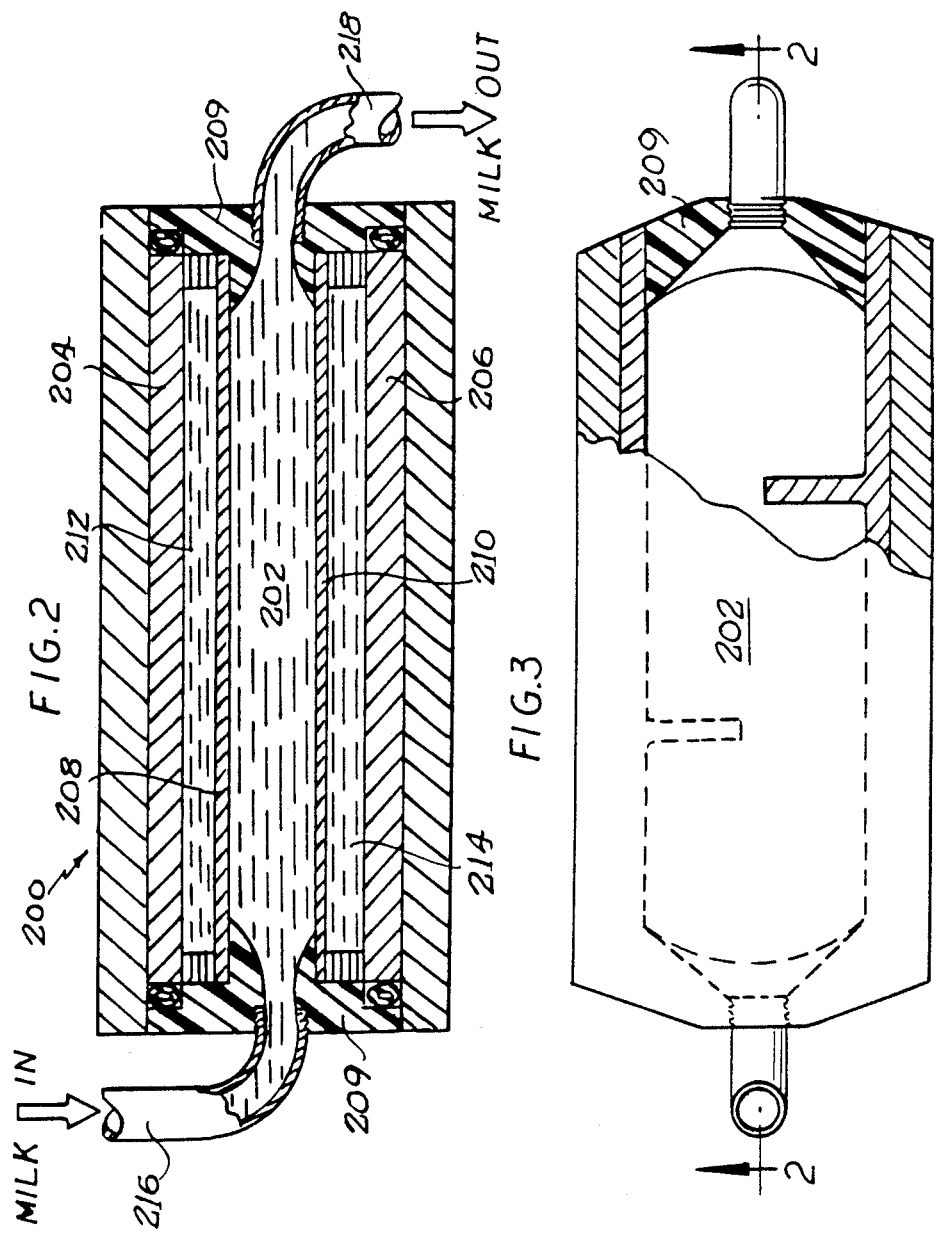

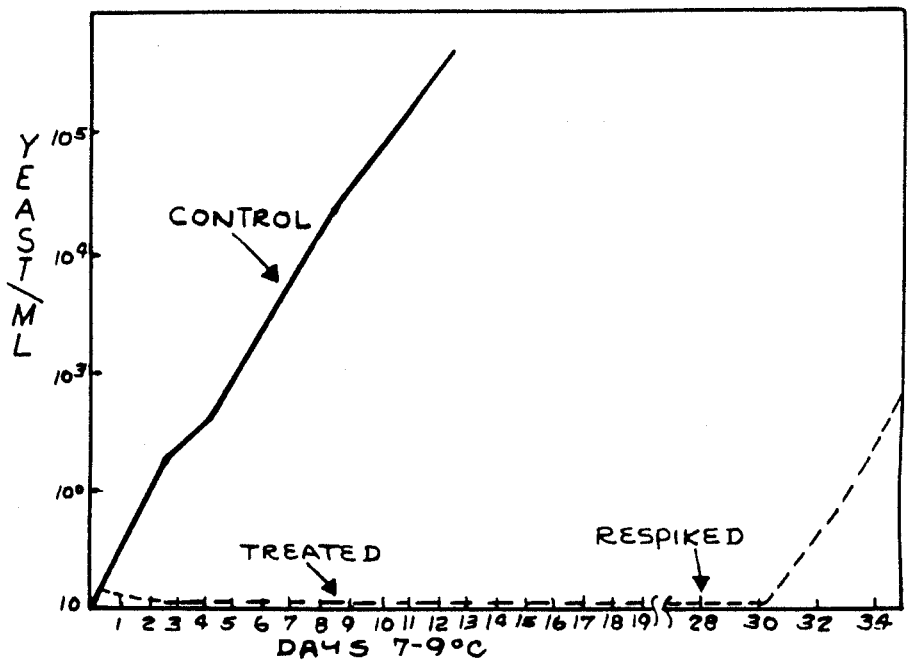
FIG.10 ELECTRIC FIELD TREATED YOGURT WITH YEAST
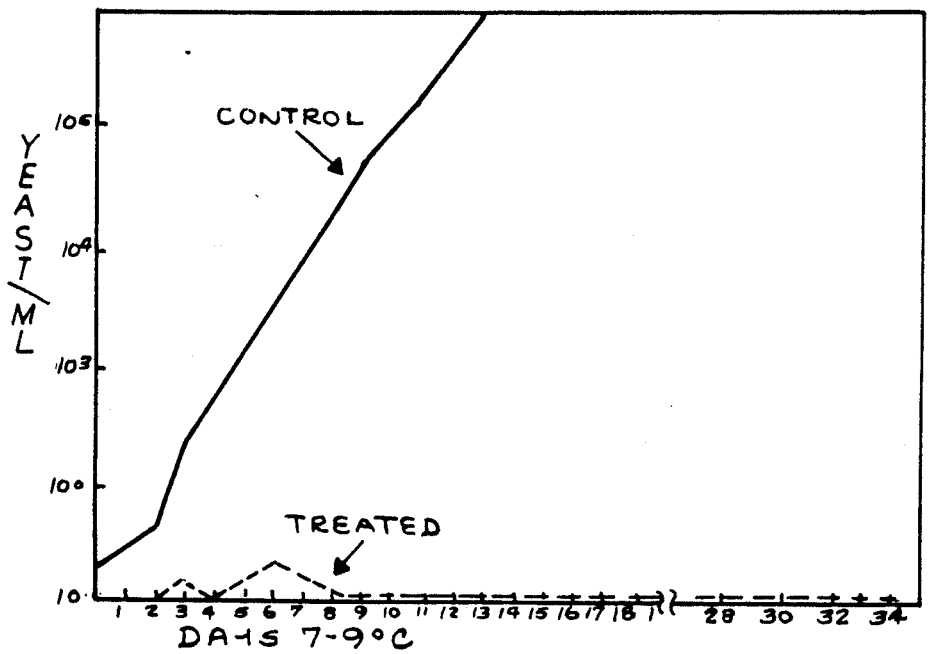
FIG.11 ELECTRIC FIELD TREATED YOGURT WITH LOW CONCENTRATION OF YEAST

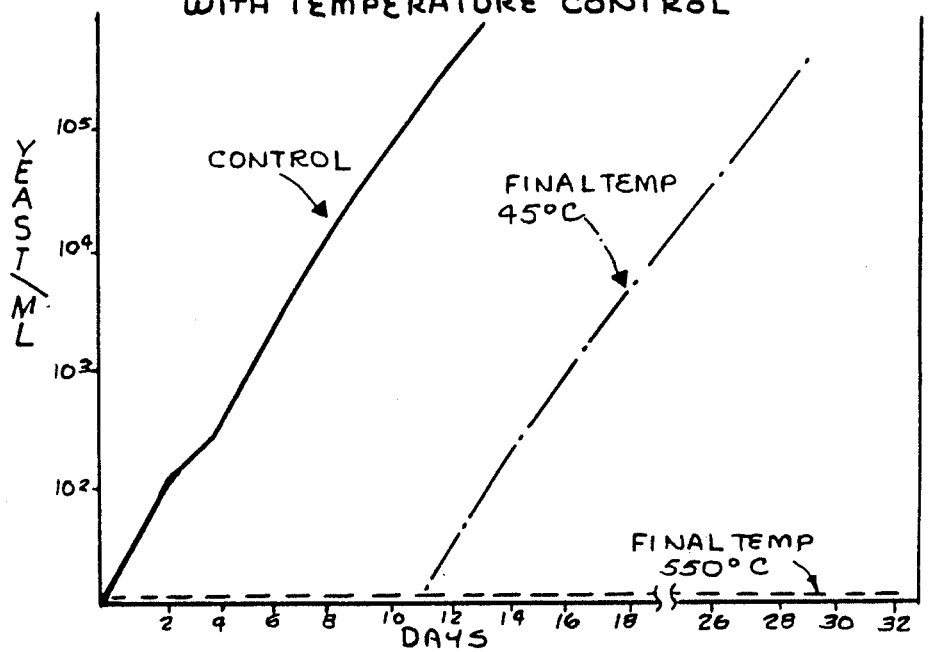
FIG.12 ELECTRIC FIELD TREATED YOGURT WITH TEMPERATURE CONTROL
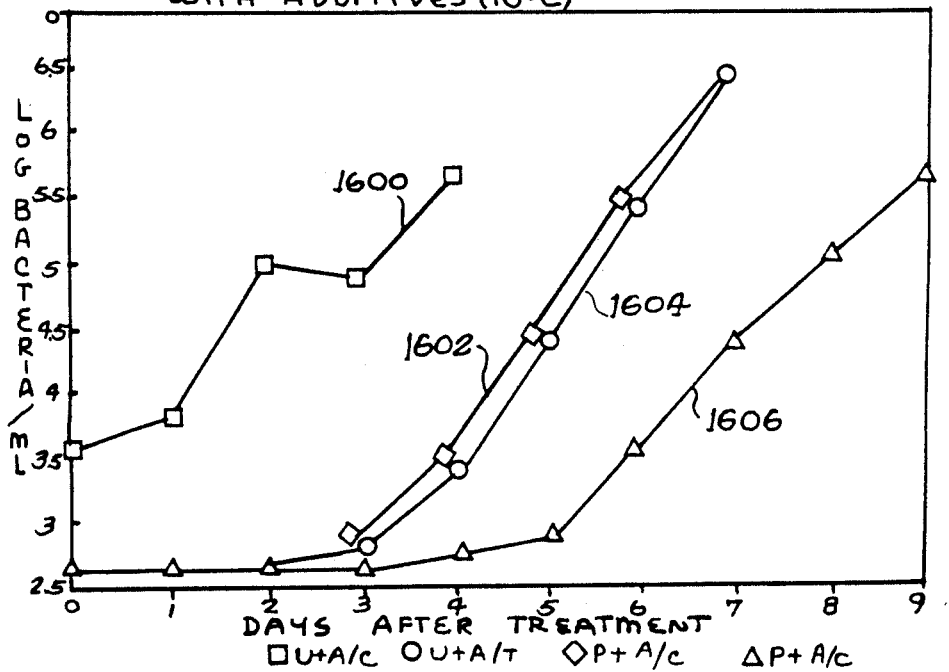
FIG.16 UNPASTEURIZED AND PASTEURIZED WITH ADDITIVES (10°C)

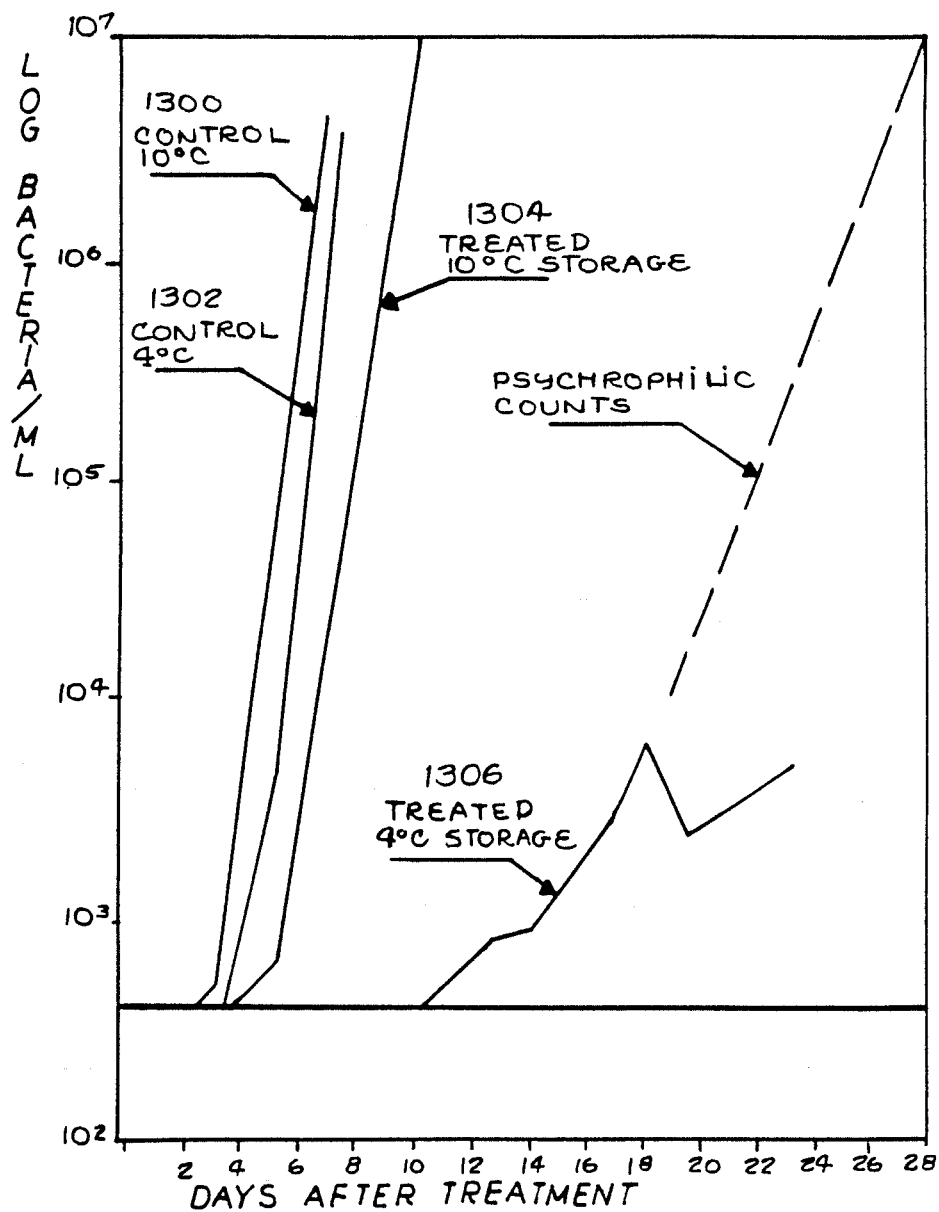

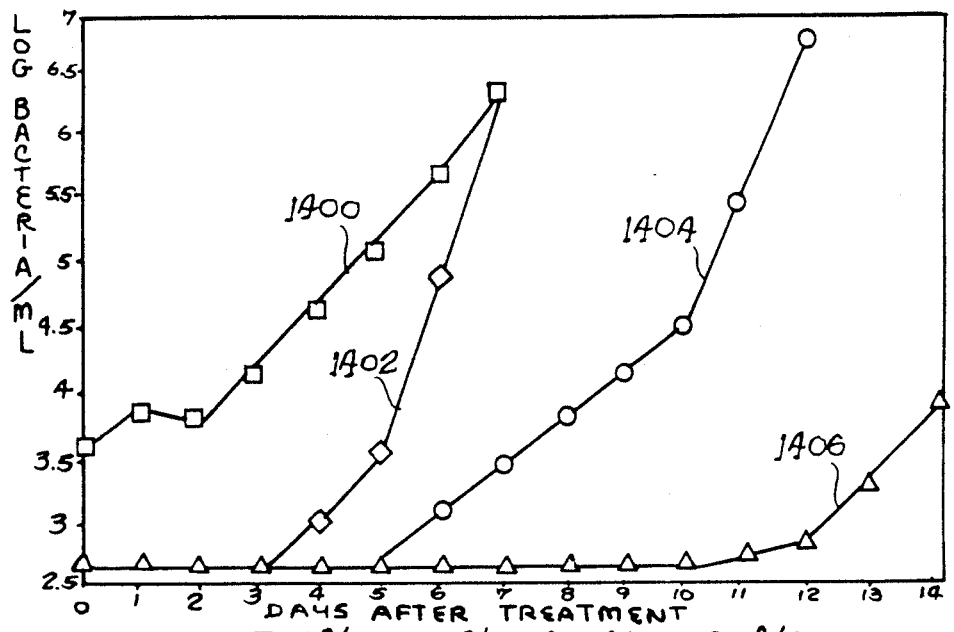
FIG. 14 UNPASTEURIZED AND PASTEURIZED FLUID EGG WITH ADDITIVES (4°C)
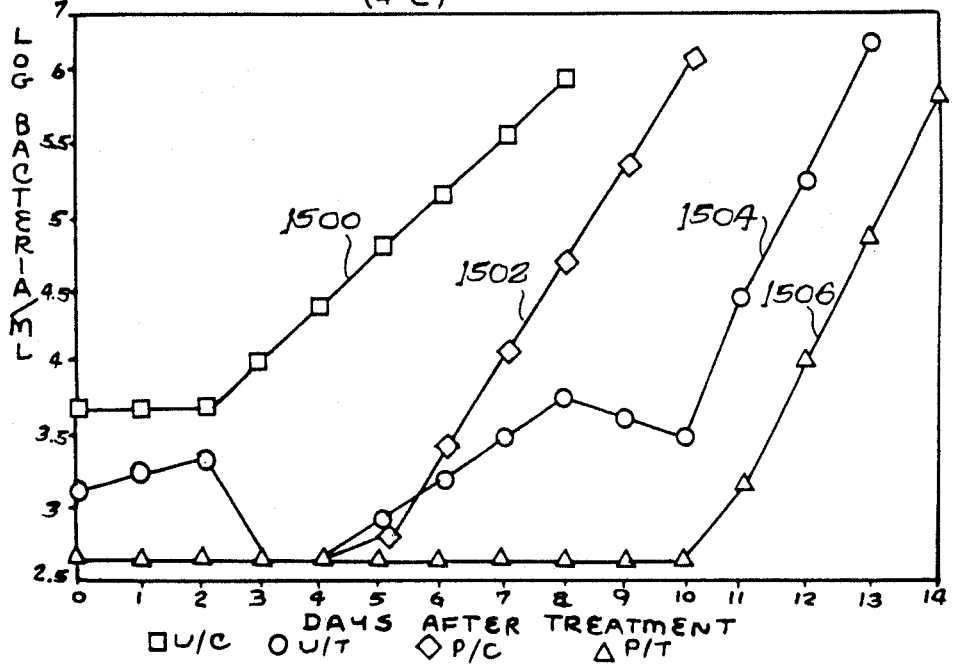
FIG. 15 UNPASTEURIZED AND PASTEURIZED FLUID EGG (4°C)

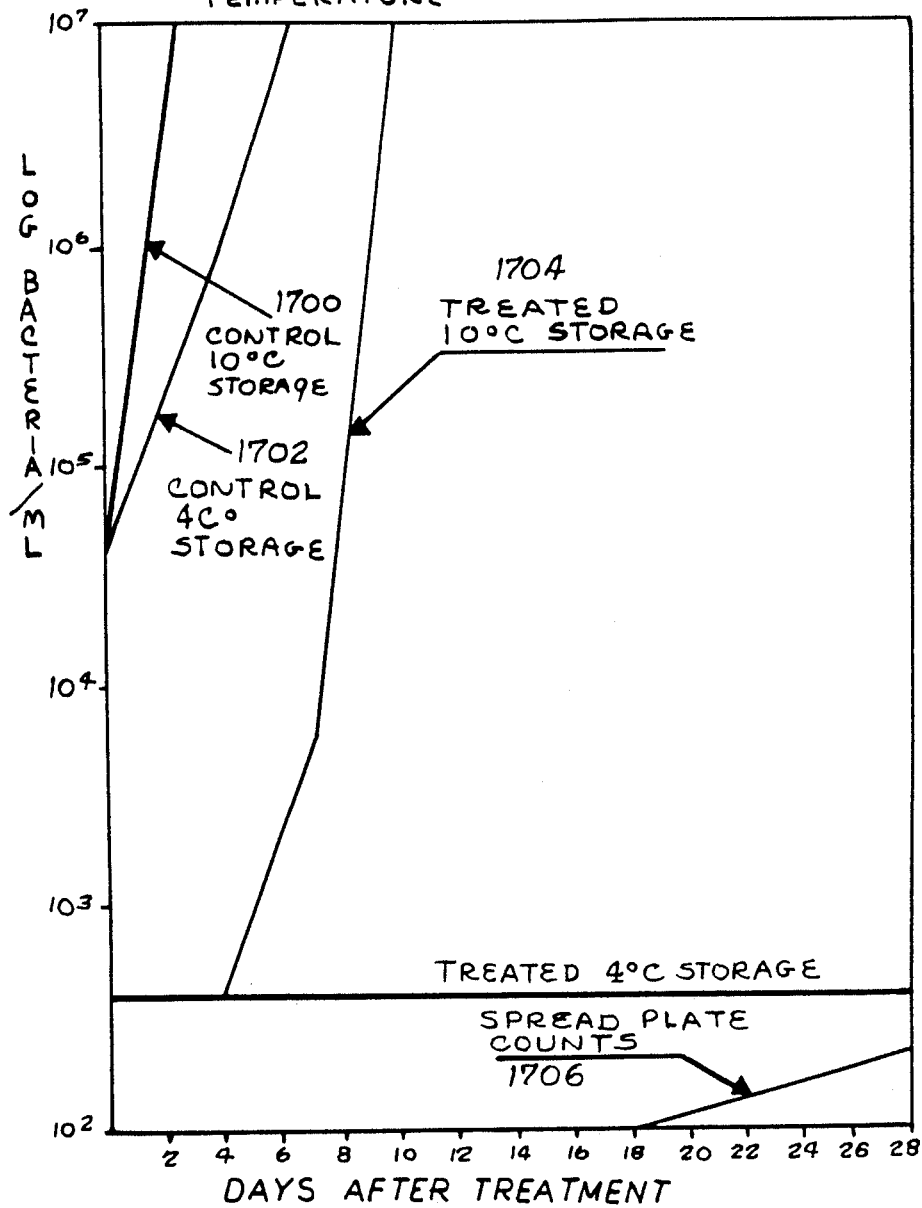

APPARATUS FOR EXTENDING THE SHELF LIFE OF FLUID FOOD PRODUCTS

This is a division of application Ser. No. 740,004, filed May 31, 1985, now U.S. Pat. No. 4,695,472.

The present invention is directed to methods and apparatus for preserving fluid liquid foodstuffs, and more particularly is directed to such methods and apparatus for extending the shelf-life of perishable fluid foodstuffs such as dairy products, fruit juices and liquid egg products, which are growth media for microorganisms. The present invention is also directed to preserved liquid foodstuffs which have extended shelf-life.

BACKGROUND OF THE INVENTION

Substantial technical effort has been directed to the preservation of perishable fluid food products such as milk products, natural fruit juices and liquid egg products which may normally contain a wide variety of microorganisms, and which are excellent culture media for microorganisms.

Practical preservation methods which have found significant commercial application predominantly utilize heat treatment such as pasteurization to inactivate or reduce the microorganism population. For example, milk products are conventionally pasteurized at a minimum temperature of at least about 72° C. for 15 seconds (or equivalent time/temperature relationship) to destroy pathogenic bacteria and most of the nonpathogenic organisms, with degradative enzyme systems also being partial or totally inactivated. However, products processed in this manner are still generally nonsterile and have limited shelf-life, even at refrigeration temperature. The shelf-life of liquid foodstuffs may be substantially extended by higher heat treatment processes such as "ultra high pasteurization", or "ultra heat treatment" ("UHT") such as treatment of from about 94° C. for 3 seconds to about 150° C. for one second in conjunction with aseptic packaging to achieve complete destruction of all bacteria and spores. However, such heat treatment typically adversely affects the flavor of the food product, at least partially denatures its protein content or otherwise adversely affects desired properties of the fluid food product. Other approaches to liquid food preservation, which also have certain disadvantages, include the use of chemical additives or ionizing radiation.

The bactericidal effects of electric currents have also been investigated since the end of the 19th century, with various efforts having been made to utilize electrical currents for treating food products, such as described in U.S. Pat. Nos. 1,900,509, 2,428,328, 2,428,329 and 4,457,221 and German Patents Nos. 1,946,267 and 2,907,887. The lethal effects of low-frequency alternating current with low electric field strength have been largely attributed to the formation of electrolytic chemical products from the application of current through direct contact electrodes, as well as ohmic heating produced by current flow through an electrically resistive medium. As described in U.S. Pat. No. 3,594,115, lethal effects of high voltage arc discharges have also been attributed to electrohydraulic shock waves. However, such electrolytic chemical products may be undesirable in fluid foodstuffs, and the utilization of explosive arc discharges to produce microbiologically lethal shock waves has not found widespread application in the provision of edible liquid foodstuffs having extended shelf life.

More recently, separately from the art of food preservation, the effect of strong electric fields on microorganisms in nonnutrient media has been studied as a mechanism for reversibly or irreversibly increasing the permeability of the cell membrane of microorganisms and individual cells [Sale, et al., "Effects of High Electric Fields on Microorganisms III. Lysis of Erythrocytes and Protoplasts", Biochmica et Biophysica Acta, 163, pp. 37-43 (1968); Hulsheger, et al., "Killing of Bacteria with Electric Pulses of High Field Strength", Radiat. Environ Biophys, 20, pp. 53-65 (1981); Hulsheger, et al., "Lethal Effects of High-Voltage Pulses on *E. coli* K12", Radiat. Environ. Biophys. 18, pp. 281-288 (1980); Zimmermann, et al., "Effects of External Electrical Fields on Cell Membranes", Bioelectrochemistry and Bioenergetics, 3, pp. 58-63 (1976); Zimmermann, et al., "Electric Field-Induced Cell-to-Cell Fusion", J. Membrane Biol., 67, pp. 165-182 (1982); Hulsheger, et al;., "Electric Field Effects on Bacteria and Yeast Cells", Radiat. Environ. Biophys; 22, pp. 149-162 (1983); U. Zimmermann, et al., "The Development of Drug Carrier Systems: Electrical Field Induced Effects in Cell Membranes", Biochemistry and Bioenergetics, 7, pp. 553-574 (1980); Jacob, et al., "Microbiological Implications of Electric Field Effects II. Inactivation of Yeast Cells and Repair of Their Cell Envelope", Zeitschrift fur Allgemeine Mikrobiologic, 21, 3, pp. 225-233 (1981); Kinositas, Jr., "Formation and Resealing of Pores of Controlled Sizes in Human Erythrocyte Membrane", Nature, 268, 4, pp. 438-440 (August 1977); Neamann, et al., "Gene Transfer into Mouse Lymphoma Cells by Electroporation in High Electric Fields", IRI Press Limited, Oxford, England, pp. 841-845]. The application of high electric fields to reversibly increase the permeability of cells has been used to carry out cell fusion of living cells and to introduce normally excluded components into living cells. Electric fields in nonnutrient media have a direct lethal effect upon microorganisms with the rate of kill dependent upon the field strength above a critical field level and the duration of the applied high voltage pulse or pulses.

These studies postulate the cell membrane as the site of a critical effect, of reversible or irreversible loss of membrane function as the semipermeable barrier between the cell and its environment. An external field of short duration is assumed to induce an imposed transmembrane potential, which may produce a dramatic increase of membrane permeability above a critical electric field value. Because an increase in cell permeability prevents the counteracting of differences in osmality of the cell content and surrounding media, exchange or loss of cell contents, cell lysis and irreversible destruction may occur as secondary mechanisms in nonnutrient media which limit the ability of cells to repair themselves, and which adversely affect permeable cells through osmotic pressure differences between the medium and the interior of the cell.

However, such research has not found practical application in respect to methods for providing fluid food products having extended shelf life. Accordingly, it is an object of the present invention to provide methods and apparatus for extending the shelf life of perishable food products such as dairy products, natural fruit juices and fluid egg products.

These and other objects of the present invention will become apparent from the following detailed description and the accompanying drawings of which:

FIG. 1 is a schematic illustration of an embodiment of a processing system for extending the shelf life of perishable liquid foodstuffs in accordance with the present invention;

FIG. 2 is a cross sectional side view of an embodiment of a pulsed electric field treatment processing cell unit which may be utilized in the system of FIG. 1;

FIG. 3 is a top view, partially broken away, of the pulsed electric field treatment processing cell unit of FIG. 2;

FIG. 10 is a graphic representation of the shelf-life extension provided to yogurt seeded with a low level of yeast, by pulsed electric field treatment utilizing the apparatus of FIG. 6, which has been reseeded with yeast after a specified time period;

FIG. 11 is a graphic representation of the shelf-life extension provided to yogurt seeded with a low level of yeast, by pulsed electric field treatment utilizing the apparatus of FIG. 6;

FIG. 12 is a graphic representation of the increase in shelf-life extension of yogurt which is provided by control of temperature parameters by pulsed electric field treatment utilizing the apparatus of FIG. 6;

FIG. 13 is a graphic representation of the microbiological population of pasteurized fluid egg product containing chemical preservatives as a function of time after pulsed electric field treatment, in comparison with control samples;

FIG. 14 is a graphic representation of the microbiological population of unpasteurized and pasteurized fluid egg product with chemical preservatives as a function of time after pulsed electric field treatment;

FIG. 15 is a graphic representation of the microbiological population of pasteurized and unpasteurized fluid egg product without chemical preservatives at a storage temperature of 4° C. as a function of time after pulsed electric field treatment;

Figure 4:
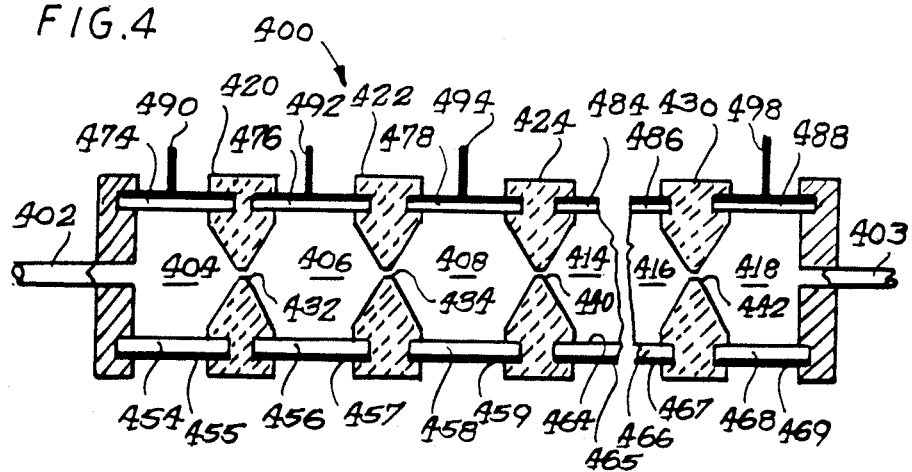
FIG. 4 is a cross sectional side view of an embodiment of a continuous current, high electric field treatment cell assembly which may be utilized in the processing system of FIG. 1.
Figure 5:
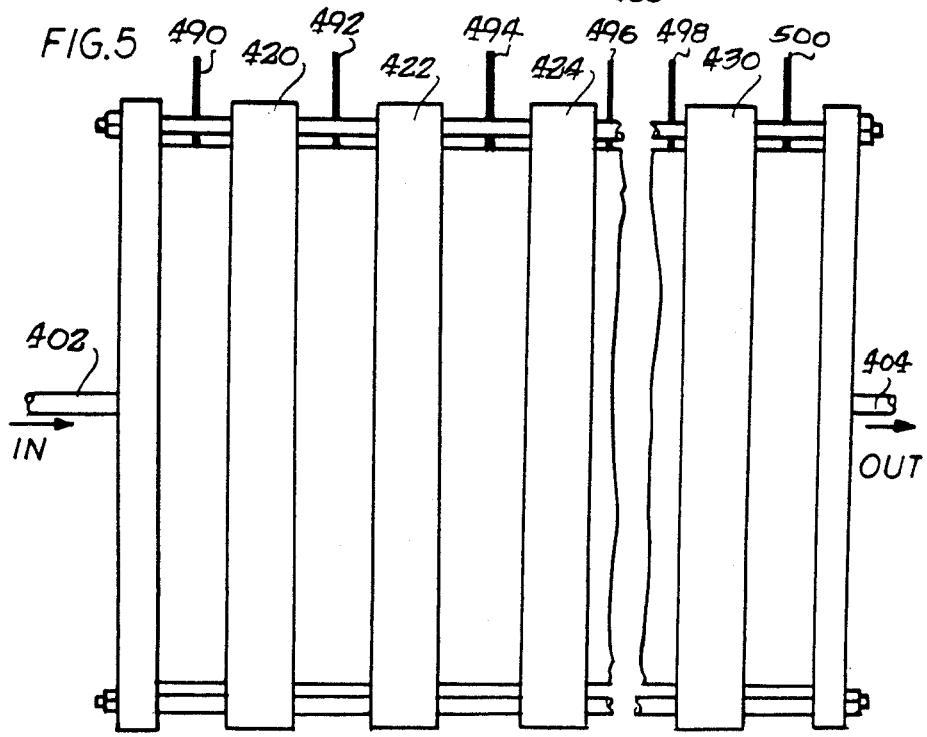
FIG. 5 is a top view, partially broken away, of a portion of the electric treatment cell assembly of FIG. 4.

FIG. 16 is a graphic representation of the microbiological population of unpasteurized and pasteurized fluid egg product with chemical preservatives at a storage temperature of 10° C. as a function of time after pulsed electric field treatment; and FIG. 17 is a graphic representation of the microbiological population of pasteurized fluid egg product containing chemical preservatives as a function of time after pulsed electric field treatment at a temperature elevated to approximately 60° C. in comparison with control samples.

DESCRIPTION OF THE INVENTION

Generally in accordance with the present invention, methods and apparatus are provided for fluid foodstuffs which are normally excellent bacteriological growth media. By "fluid foodstuff" is meant an edible pumpable food product having a viscosity of less than about 1000 centipoise, and preferably less than about 150 centipoise, at a temperature above 0° C., comprising in the range of from about 50 to about 95 percent by weight water, and from about 4 to about 50 percent by weight of solids selected from the group consisting of proteins, carbohydrates and fats, and mixtures thereof, based on the total weight of the fluid foodstuff. The viscosity of the foodstuff may generally best be determined at ambient temperature (e.g., about 23° C.) or an elevated processing temperature (e.g., 65° C.). By "bacteriological growth medium" is meant that upon storage at a temperature in the range of 10° C. to about 30° C., the fluid foodstuff, with its indigenous microbiological population or when seeded with test organisms, will demonstrate an increase in biological content or activity as a function of time as detectable by direct microscopic counts, colony forming units on appropriate secondary media, metabolic end product analyses, biological dry or wet weight or other qualitative or other quantitative analytical methodology for monitoring increase in biological activity or content. For example, under such conditions the microbiological population of a liquid foodstuff which is a bacteriological growth medium may at least double over a time period of two days. The fluid foodstuffs will have an electrical conductivity of at least about 0.001 mhos cm$^{-1}$, although deionized food products may also be treated which have lower conductivities, and a combined sodium and potassium content of at least about 0.10 weight percent, based on the total weight of the fluid foodstuff. The compositions of typical fluid food products which are biological growth media, derived from "Nutritive Value of American Foods in Common Units", Agriculture Handbook No. 456 of the U.S. Department of Agriculture (1975), are as follows:

| | FLUID FOODSTUFFS | | | | | |
|---|---|---|---|---|---|---|
| Fluid Food Product | Water Wt % | Protein Wt % | Fat Wt % | Carbohydrate Wt % | Na Wt % | K Wt % |
| Whole Milk (3.5% fat) | 87.4 | 3.48 | 3.48 | 4.91 | .05 | .144 |
| Yogurt** | 89.0 | 3.40 | 1.68 | 5.22 | .050 | .142 |
| Raw Orange Juice | 88.3 | .685 | .20 | 10.0 | .0008 | .2 |
| Grape Juice | 82.9 | .001 | trace | .166 | .0019 | .115 |
| Raw Lemon Juice | 91.0 | .41 | .20 | 8.0 | .0008 | .14 |
| Raw Grape- | 90.0 | .48 | .08 | 9.18 | .0008 | .16 |

-continued

| Fluid Food Product | Water Wt % | Protein Wt % | Fat Wt % | Carbo-hy-drate Wt % | Na Wt % | K Wt % |
|---|---|---|---|---|---|---|
| fruit Juice Apple Juice | 87.8 | .08 | trace | 11.9 | .0008 | .10 |
| Raw Whole Eggs | 73.7 | 12.88 | 11.50 | .90 | .12 | .13 |
| Fresh Egg Whites | 87.6 | 10.88 | .02 | .79 | .15 | .14 |
| Split Pea Soup* | 70.7 | 6.99 | 2.60 | 16.99 | .77 | .22 |
| Tomato Soup* | 81.0 | 1.60 | 2.10 | 12.69 | .79 | .187 |
| Tomato Catsup | 68.6 | 2.0 | .588 | 25.4 | 1.04 | .362 |

*condensed - commercial
**from partially skimmed milk

In accordance with the present methods, all of the fluid foodstuff is subjected to a sequential plurality of high electric field pulses, each having a minimum field strength of at least about 5,000 volts per centimeter, and preferably at least about 12,000 volts per centimeter, and having a duration of at least about 1 microsecond and preferably a duration in the range of from about 5 to about 100 microseconds, to provide an electrically field stressed fluid foodstuff. All of the fluid foodstuff should be subjected sequentially to at least 2 high electric field pulses, and more preferably at least about 5 pulses. The treatment interval between pulses should desirably be less than about one minute, and preferably less than about one second. By the "duration" of an electric field pulse is meant the length of time the electric field exceeds the minimum field strength. As indicated, all of the electrically stressed fluid foodstuff should be subjected to the multiple pulse treatment.

It is also desirable that the fluid foodstuff be subjected concomitantly with the high voltage electric field pulses, to pulses of high electrical current density through all of the fluid foodstuff, of at least about 1 microsecond, and preferably in the range of from about 5 microseconds to about 100 microseconds. Typically, for fluid food products having an electrical resistivity in the range of from about 1 to about 1000 ohm-centimeters, the current density of the current pulses should be at least about 5 amperes per square centimeter, and most preferably at least about 12 amperes per square centimeter.

The electrically stressed fluid foodstuff should be maintained under substantially sterile conditions, and may be packaged to provide a packaged food product having extended shelf-life. Desirably, the electrically stressed fluid foodstuff may be maintained and packaged under aseptic conditions after being subjected to the pulsed electric field treatment.

In accordance with various preferred aspects of the present invention, the temperature at which the fluid foodstuff is treated may be controlled to substantially increase the shelf-life of the treated product. In this regard, all of the food product may be subjected to at least one such electric field pulse at a temperature of at least about 45° C. and more preferably, at least about 55° C. By subjecting the fluid food product to pulsed electric field treatment at pasteurization temperatures, such as in the range of from about 63° to about 75° C., substantially improved shelf-life extensions may be achieved over those obtained by pasteurization alone, without the adverse effects on the fluid food product which result from UHT treatment at high temperature. In addition, by promptly cooling the electric field treated liquid foodstuff to a refrigeration temperature of less than about 10° C., and preferably in the range of from about 0° C. to about 9° C., further substantial improvement in shelf-life may be obtained. Desirably, the food product should be cooled to refrigeration temperature within 30 minutes, and preferably within 3 minutes of the electric field treatment. The high voltage electrically field treated fluid foodstuff may be rapidly cooled by means of continuous flow heat exchange units prior to packaging or bulk storage. In this manner, it is believed that electrically treated organisms having cell wall damage may be cooled to an inactive metabolic condition before cell wall repair may be accomplished, thereby enhancing the product shelf-life.

This synergistic relationship between electric field treatment and temperature during and after treatment such that the use of heating and/or cooling and electric field in a carefully controlled manner greatly enhances the effect of the process over that achieved using electric field or heating or cooling alone. The temperature control is carried out so that the processed liquid foodstuff is respectively above or below the optimal temperature range for biological activity. During the electric field treatment phase, the high voltage electric pulse treatment process may be either discontinuous, with discrete portions of fluid foodstuff being treated as a unit by subjecting all of the liquid foodstuff to a sequence of pulsed electric fields which are each of substantially uniform field strength throughout all of the liquid food product to be treated. The processing may also be continuous, with the treated foodstuff flowing into and being emitted by the treatment system in a steady stream. Heating of the liquid foodstuff for temperature control during processing may be carried out through electric field energy deposition (resistive heating) or through other means, for example, but not limited to, thermal heat exchange, steam injection, resistive heating through a resistive source secondary to the primary electric field driver, or microwave heating.

Typical operating conditions for the system include the provision of electric pulses having electric field strengths of from about 5 kilovolts per centimeter to about 25 kilovolts per centimeter with flat-topped or exponentially decaying pulse shapes of typical duration between 1 and 100 microseconds and repetition rates between 0.1 and 100 hertz. Higher electric field strengths may be provided, such as up to about 30 kV/cm particularly for very short duration pulses and depending on the properties of the fluid foodstuff being processed. However, at high field strengths, the uniformity of the electric field and current density through the fluid foodstuff degrades as a function of time, with a tendency to produce arcs or current filaments. Accordingly, higher strength field pulses may require high precision control of field uniformity and pulse length to prevent the development such filaments or arcs. Where heating by electric field is beneficial, exponentially decaying pulse shapes are employed; where the heating by electric field treatment is to be kept to a minimum, relatively flat-topped electric field pulses are used.

Electric field treatment should best be carried out with pulses having an electric field strength in the range of from about 12 kilovolts per centimeter to about 25 kilovolts per centimeter. Depending upon the application, i.e., the selective killing of a particular organism versus the broad spectrum killing of mixed bacterial populations, pulse duration should be in the range of from about 1 to 100 microseconds with preferred values between 10 and 40 microseconds. The variation of pulse duration may be used to control heating within the liquid food product being treated. For example, long pulse lengths can be used to raise the temperature of the sample to temperatures synergistic with the electrical effect; multiple, short square wave pulses can then be rapidly delivered to complete the treatment.

Sequential electric field (and concomitant electric current) pulses may be of the same polarity, or may be of sequentially alternating polarity. It is also noted that the electric field pulsed may preferably be established between electrodes having respective positive and negative polarity with respect to a ground potential, or between electrodes, one of which is maintained generally at ground potential and the other of which is pulsed at either positive or negative potential with respect to ground potential. High voltage electric pulses may also be provided, however, between electrodes, both of which are at either positive or negative potential with respect to ground potential.

As indicated, various preferred aspects of the present invention concern synergistic utilization of the effects of electric field treatment at elevated, controlled temperatures together with control of post-treatment incubation or storage temperature. Such thermally controlled processing has been found to not only affect the degree of microbiological kill seen immediately after treatment but also the long term microbiological viability, i.e., shelf-life.

Heat applied before or during electric field treatment may be used to produce microbiological kill rates in the fluid foodstuff greater than those obtainable by electric field or heat treatment alone. The elevation of heat during treatment to a temperature stressful to but not necessarily lethal to microorganisms for the time employed, is believed to exaggerate the membrane damage sustained during treatment. This may occur through an increase in membrane fluidity or porosity, producing greater damage per treatment dosage, a decrease in the capability of the damaged microorganism to effect repair during and after treatment due to the disruptive effects of such stressful temperature elevation upon cellular metabolism, and/or an increase in any osmotic effects secondary to the electric field membrane damage. By rapidly cooling the electrically treated fluid foodstuff to a refrigeration temperature, it is believed that the normal cellular mechanisms for repair or decrease of the electric field-induced cell membrane permeability are retarded, thereby increasing cell vulnerability and decreasing the reproductive capacity of remaining bacteria or spores which survive the electric field treatment.

When microorganisms are subjected to high electric fields for sufficiently long periods of time, cell permeability is established and transcellular ion and osmotic flow may occur. This flow may be interrupted because biological membranes are exceptionally resilient and the induced transmembrane pores resealed in time for the cell to survive. A permeable cell which is not destroyed by the electric field treatment must reseal its membrane, reestablish active transport and readjust its internal ionic and fluid content if it is to survive.

In nutritive media such as milk, natural fruit juices and natural liquid egg products, cells that are actively growing at the time of treatment may recover under appropriate conditions. However, in accordance with the present invention, effective processing may be carried out in nutritive media by temperature control. Incubation at refrigeration temperatures after treatment can reduce the metabolic level of electrically treated microorganisms and hence tend to diminish recovery and repair. Similarly, elevation of the temperature of the sample during treatment may be used to increase the kill level; in a manner similar to cooling, the heat affects cellular metabolism at temperatures greater than the growing temperature of the bacteria, even though the elevated temperature may be less than that which kills through immediate exposure.

Even though the treatment temperature is not high enough to produce significant shelf life extension by itself, elevated temperatures which stress the treated bacteria can greatly enhance the kill and shelf life extension provided by the treatment. Moreover, post treatment incubation conditions further significantly affect the shelf life extension. Electrically treated liquid food products incubated at room temperature after treatment may begin to regenerate immediately, whereas samples incubated at refrigeration temperatures (4°–9° C.) typically do not begin to increase in numbers until several days after treatment. These observations are believed to relate to the degree of repair occurring during and after sample treatment.

As indicated, in accordance with the present invention, the fluid foodstuff is subjected to a plurality of high voltage electric pulses. The fluid food product may be subjected to such a plurality of pulses by a variety of processing techniques. In one such processing method, the liquid foodstuff is introduced into a treatment zone between two electrodes which have a configuration adapted to produce a substantially uniform electric field therebetween. High voltage electric pulses may be applied to the electrodes to subject the liquid foodstuff to the multiple pulse treatment by pulsed field apparatus such as lumped transmission line circuits, Blumlein transmission circuits and/or capacitive discharge circuits. If the liquid foodstuff is continuously introduced into the treatment zone to which high voltage pulses are periodically applied, and fluid foodstuff is concomitantly withdrawn from the treatment zone, the rate of passage of the liquid foodstuff through the treatment zone should best be coordinated with the pulse treatment rate so that the liquid foodstuff is subjected to at least two pulses within the treatment zone. The liquid foodstuff may be subjected to treatment in a sequential plurality of such treatment zones, as will be described in more detail hereinafter.

Also in accordance with various other aspects of the present invention, methods for effectively subjecting all of the liquid food product to a sequential series of high electric field and current pulses may also be carried out by continuously forcing the fluid foodstuff through an orifice zone of restricted length and cross sectional area from a first electrode zone and to a second electrode zone, and continuously conducting an electrical current between the first electrode zone and the second electrode zone through the liquid food product such that an electrical field of at least about 5000 volts per centimeter is maintained in the restricted orifice zone. The rate of passage of the liquid food product through the high field restrictive orifice zone should result in an effective pulsed treatment time of at least about 1 microsecond for the foodstuff as it is forced through the zone.

In accordance with apparatus aspects of the present invention, pulsed field treatment apparatus for preservation of liquid foodstuffs is provided comprising an electric field treatment chamber comprising a first electrode means for making electrical contact with liquid foodstuff disposed adjacent said first electrode means in said chamber, a second electrode means spaced apart from said first electrode means for making electrical contact with liquid foodstuff disposed in said chamber between said first electrode means and said second electrode means, an inlet conduit means for introducing a fluid foodstuff to be treated into said electric field treatment chamber, an outlet conduit means for discharging fluid food product which has passed through said treatment chamber, means for applying high voltage electrical pulses to said first and second electrode means at a rate of at least about 0.01 pulse per second and preferably at least about one pulse per second to provide an electric field between said electrodes through a fluid foodstuff located therebetween of at least about 5000 volts per centimeter, and means for pumping a fluid foodstuff through said inlet conduit means at a rate such that all of said fluid foodstuff is subjected to at least two pulses in transit through said high voltage treatment zone before it is conducted from the chamber through said outlet conduit means. Such apparatus may further include means for heating the fluid foodstuff to a predetermined temperature of at least about 45° C., and more preferably at least about 55° C. before introduction to the treatment chamber, and may further include means for cooling the fluid foodstuff which has passed through said one or more treatment zones to a refrigeration temperature in the range of from about 0° to about 10° C.

Desirably, the first and second electrode means may be adapted to prevent direct electrolysis of the fluid foodstuff upon application of a pulsed electric field thereto. In this regard, such electrodes may comprise an electrically conductive electrolysis electrode, an ion permeable membrane and an intermediate electrolyte, such that ionic electrical connection is made with the fluid foodstuff through the ion permeable membrane rather than by direct contact with the electronically conductive electrode.

Also contemplated by the present invention, is electric field treatment apparatus comprising means defining a first electrode reservoir zone, means defining a second electrode reservoir zone, means defining a restrictive orifice between said first reservoir zone and said second reservoir zone, means for continuously conducting an electric current in fluid foodstuff between said first reservoir zone and said second reservoir zone and through said at least one said restrictive orifice to provide an electric field gradient in said restrictive orifice of at least about 5000 volts per centimeter, and means for forcing fluid foodstuff from said first electrode reservoir zone through said restrictive orifice into said second reservoir zone at a rate which provides an effective pulsed field treatment time in said restrictive orifice of at least about 1 microsecond, and preferably in the range of from about 5 to about 50 microseconds. By providing restrictive orifices of relatively short channel length, such as less than about 0.1 centimeters, preferably in the range of from about 0.05 to about 0.005 centimeters, and by forcing the fluid food product through the orifice at high differential pressure of at least about 50 psi across the orifice, short treatment times and high field current gradients may be provided on a continuous processing basis.

Having generally described various aspects of the present invention, electric field treatment of fluid food products will be more particularly described with respect to the processing system which is schematically illustrated in FIG. 1. As shown in FIG. 1, the electric field food processing system comprises a storage reservoir 100 for the liquid food product to be treated, an inline heating unit 102, a deaeration apparatus 104 having a suitable vacuum system 106 associated therewith, and an electric field treatment cell 108 in which the electric field treatment of the liquid foodstuff is carried out. The treatment cell has associated therewith a cell monitor 110 having appropriate sensor instrumentation to monitor the temperature and voltage conditions within the cell. The high voltage pulses to the cell are provided by high voltage pulser 112, which may be a high voltage lumped transmission line circuit, properly impedance matched to the treatment cell, a Blumlein transmission line circuit properly impedance matched to the treatment cell 108, or a capacitive discharge circuit. The temperature and voltage information from the cell monitor 110 is provided as a data input stream to the system control and analysis microprocessor 114, which controls the operation of the high voltage pulser 112. The system control and analysis microprocessor 114 is provided with a production line interface 116 which is adapted to interface with automated production line apparatus having computer control systems. The illustrated electric field processing system further comprises refrigeration apparatus 120 for cooling the treated process stream from the heat exchanger 118 to provide a refrigerated, electrical field treated foodstuff stream for aseptic packaging apparatus 122. The packaging apparatus 122 packages the treated process stream into either individual sterilized consumer packages 124 or sterilized bulk transport containers which are stored in refrigerated storage apparatus 126 until delivery to the consumer. In operation, the liquid food product to be treated, which in the illustrated embodiment may be fluid milk, a natural fruit juice such as orange juice, or a liquid natural egg product, is pumped from the storage reservoir 100 to the heat exchange unit 118 so that the heat energy is conserved within the treatment system. In this regard, the treated liquid food product which has passed through the cell 108 is conducted into heat exchange relationship with the liquid food product which is to be introduced into the treatment cell 108 by means of heat exchanger 118. After exiting the heat exchange unit 118, the fluid food product to be treated may be heated to a predetermined temperature by heating unit 102. The extent of such heating, if any, is determined by the desired processing temperature within the electric pulse processing cell 108. Because the electric cell treatment may also raise the temperature of the liquid food product, the degree of heating provided by the heating unit 102 may depend in some measure upon the efficiency of the heat exchange unit 118. Typically, the temperature of the fluid product emerging from the heating unit 102 may be at least about 40° C., and in some cases may be at least about 50° C. or more.

The heated liquid food product stream from the heating unit 102 is conducted to the deaeration unit 104. In the unit 104, the liquid may be subjected to vacuum conditions of at least about 20 inches of mercury in order to remove dissolved gases and/or product bubbles which might adversely affect the development of a substantially uniform electric field in the treatment cell 108.

The deaerated liquid food product is continuously passed through the electric pulse treatment cell 108, in which it is subjected to, in the illustrated embodiment, a plurality of high voltage electric pulses at a field strength of at least about 12,000 volts per centimeter and a duration in the range of from about 5 to about 50 microseconds. At least one of the pulses is carried out at a temperature in the range of from about 50° C. to about 70° C. The treated liquid food product is conducted back to the heat exchange unit 118 where it is cooled by the incoming liquid food product, and is subsequently conducted to refrigeration unit 120 where it is cooled to a temperature of less than about 10° C., and preferably less than about 5° C. within about one minute of its pulsed electric field treatment. While in the illustrated embodiment, the refrigeration unit is used to substantially immediately cool the product in an energy efficient manner, it is noted that the product may also be cooled after it is packaged. The cooled, electrically treated liquid food product stream is subsequently introduced as an input stream to aseptic packaging apparatus 122 which packages the product in sterilized containers 124 under sterile conditions. The packaged product containers 124 are maintained under refrigeration conditions by appropriate refrigeration storage apparatus 126 until distribution to the consumer. Such storage apparatus may include refrigeration storage units at the packaging plant, refrigeration transport units in the distribution system, and refrigeration storage units at the distribution warehouse, grocery store or other consumer distribution center. Because of the extended shelf-life properties provided by the electric pulse treatment, such refrigerated storage may be carried out over an extended period of time while maintaining the freshness and keeping qualities of the processed food product.

Illustrated in FIGS. 2 and 3 is an embodiment 200 of a continuous flow electric pulse treatment cell unit which may be utilized in the apparatus of FIG. 1. The illustrated cell unit 200 comprises an electric field treatment zone 202 defined between plane metallic conductive plates 204, 206 which are maintained in parallel relationship by dielectric spacing element 209 which extends continuously about the periphery of the cell unit 200. The plane metallic plates may form electrodes in direct contact with the fluid food product to be treated. However, in the illustrated cell unit 200, the metallic electrodes 204, 206 do not directly contact the liquid food product being subjected to electric field treatment in order to isolate electrolysis products from the fluid food product. In this regard, the internal electric field treatment zone 202 is further defined by ionic conductive membranes 208, 210 which, together with the dielectric spacing insulator 209 form an enclosed zone 202 which is physically isolated from the electrodes 204, 206. The membranes 208, 210 may be of any suitable ion permeable material which is desirably substantially inert to the passage of ionic electric current therethrough. The ion membrane material should best have a specific conductance which is at least equal to the specific conductance of the liquid food product being treated within the treatment zone 202. Suitable food grade ion permeable membrane materials include cation permeable membrane materials such as sulfonated polystyrene, acrylic acid copolymers, and fluorinated hydrocarbon polymers having pendant ionic groups, such as Nafion polyfluoroethylene polymers having pendant sulfonic acid groups. Such polymers are adapted to permit cationic transport through the membrane upon application of an electric potential across the membrane, but tend to exclude anionic transport across the membrane. Other ion conductive membranes, such as commercially available high conductivity food grade anionic and cation electrophoresis membranes may also be utilized. The membranes may be supported in an appropriate manner without substantially affecting the uniformity of electric field development through the food product to be treated.

In order to provide electrical conduction between the metallic electrodes 204, 206, and the ionic membranes 208, 210, electrolyte zones 212, 214 are provided between the respective electrodes 204, 206 and the ion transport membranes 208, 210. The electrolyte provided in the ion conductivity zones 212, 214 should have a relatively high conductivity in respect to the conductivity of the liquid food product to be treated in the zone 202. Moreover, the electrolyte should best be substantially free of components such as chloride ions, which may produce undesirable electrolysis products, it being recognized in any event that such products are isolated from the food product being treated by the ionically selective membranes 208, 210. Suitable electrolyte solutions include sodium carbonate, sodium hydroxide, potassium carbonate and potassium hydroxide solutions, and mixtures thereof. The cation content of the electrolytes may be adjusted so that there is no net change in cation content of the food product being treated. The electrolyte may be circulated continuously through the zones 212, 214 in order to remove electrolysis products and/or to maintain temperature equilibrium within the treatment cell, taking appropriate care to electrically isolate the respective electrolyte circulation systems.

In order to prevent an undesired degree of concentration or depletion of ionic components as a result of ionic transport to or from the electrolyte zones 212, 214 across the respective membranes, the circulating electrolyte of each respective zone may be replaced from time to time with fresh electrolyte solution having the desired composition. The electrolyte solution from one electrolyte zone may also be exchanged periodically with the electrolyte solution from the other zone. In addition, the relative polarity of the electric pulses applied to the respective electrolyte zones 212, 214 may be alternated after each pulse, or after a predetermined number of pulses, so that the net transport of ionic components to and from the respective zones, averaged over time, is minimized or eliminated.

The thickness of the cell treatment zone 202 along the direction of the electric field may desirably be at least about 0.25 centimeters and will preferably be in the range of from about 0.5 centimeter to about 3 centimeters. The treatment unit 200 is rectangular in shape, and is adapted to be "stacked" in an array of a plurality of such cells to form the treatment apparatus 108. It may be desirable to degas the liquid food product issuing from a cell unit prior to introduction into a subsequent cell unit in the treatment apparatus. Accordingly, for example, a vacuum degassing apparatus may be provided at outlet conduit 218 for degassing of the output stream to produce a degassed, treated stream for introduction into the subsequent cell. Treatment cell units formed between concentric electrodes may also be utilized.

In operation, the fluid food product to be treated, such as liquid milk or natural liquid fruit juice, is introduced through input conduit 216 while high voltage electric pulses are repetitively applied to the metallic electrodes 204, 206 at a rate coordinated with the rate of flow of the food product through the zone 202, such that a plurality of at least two pulses is applied during the transit time of the most rapidly traveling component of the food product introduced through the zone 202. The polarity of the electric pulses may be reversed upon alternate pulses, or at other intervals, so that the ionic components do not become depleted or concentrated in the respective zones 212, 214. Moreover, as shown in FIG. 3, the treatment zone may be provided with baffles to provide a tortuous path therein in order to increase the minimum residence time of the fluid foodstuff in the zone.

Upon exiting the treatment zone 202, the treated liquid is conducted from the zone by conduit 218, which may form the input conduit to another treatment unit 200. The length of the liquid in the treatment conduit 218 may be relatively long in comparison with the thickness of the treatment cell, in order to limit the electrical conductance between the cells.

It will be appreciated that, in the absence of cooling between cells 200, subsequent cells may operate at a higher temperature in view of the ohmic heating of the liquid food product being treated. Because the conductivity of the food product tends to increase with increasing temperature, higher currents may be provided in subsequent cells for a given pulse potential, which may beneficially enhance the shelf life of the treated product. A plurality of at least two treatment cell units 200 and preferably from about 3 to about 10 such units may be utilized to form an electric pulse treatment unit such as the treatment unit 108 of FIG. 1.

As indicated, it is important that a substantially uniform electric field be provided throughout the liquid foodstuff treatment zone. If a uniform field is not maintained, particularly field gradient levels, or under conditions of impedance mismatch between the high voltage source (e.g., a Blumlein source) and the treatment chamber, current filaments or the formation of "streamer" arcs may develop within the treatment zone. When electric fields exceed an upper threshold value, e.g., about 25 kilovolts per centimeter for milk, the distribution of field within the chamber rapidly changes upon firing to yield "streamer arcs". These result in very little kill because of their small path area through the sample. Exceeding a threshold voltage value may produce not only large arcs through the fluid food product between the discharge electrodes, which may fracture the treatment chamber and leave pits upon the electrodes, but also may produce multiple, small streamer arcs which generate no visible chamber damage but which do not produce proper treatment of the fluid food products.

As previously indicated, the pulsed electric field treatment may be provided by applying a pulsed electric field to a treatment zone between two electrodes which provide a substantially uniform field between the electrodes. The liquid food product to be treated may also be subjected to pulsed electric field treatment by establishing a continuous, high gradient electric field in a relatively small treatment zone, and continuously and rapidly passing the liquid food product to be treated through the continuous, high gradient electric field zone.

Pulsed electric field treatment apparatus 400 which continuously passes the liquid food product through an established, high gradient electric field treatment zone is shown in FIG. 4 the apparatus 400 comprises a plurality of electrode reservoir zones 404, 406, 408, 414, 416, 418 which are electrically isolated from each other by intervening dielectric separating elements 420, 422, 424, 430 so that the only means for passage of electrical current, and the fluid food product itself, between the reservoir zones is one or more small passages 432, 434, 440, 442 between to electrode reservoir zones. Each of the reservoir zones may also be in respective electrical contact with an ion permeable membrane 454, 456, 458, 464, 466, 468, such as a food grade cation permeable membrane, and associated metallic electrode 455, 457, 459, 465, 467, 469. A suitable conductive aqueous electrolyte 474, 476, 478, 484, 486, 488, such as a sodium or potassium hydroxide, phosphate or carbonate solution provides ionic conduction between the respective ion permeable membrane and metal electrode of each of the electrode reservoirs. Other appropriate types of electrodes or means for making electrical contact with the liquid food product in the respective reservoir zones may also be used.

In operation, a continuous potential is applied to each of the electrodes from a suitable power supply (not shown) by means of cables 490, 492, 494, 496, 498, 500 so that an electric field of at least about 5000 volts per centimeter is established through the slot-like openings 432, 434, 440, 442 between the respective electrode reservoir zones 404, 406, 408, 414, 416, 418. The length of the openings 432, 434, 440, 442 in the direction of fluid travel between the electrode reservoir zones is relatively small, thereby producing a relatively high field gradient within the orifice.

By introducing the liquid food product to be treated under high pressure by means of inlet conduit 402, the liquid food product may be forced at high velocity through the respective openings 432, 434, 440, 442. Because all of the liquid food product which exits from the discharge conduit 403 has passed through each of the orifices 432, 434, 440, 442, it will be appreciated that all of the fluid food product is effectively subjected to a plurality of high electric field pulsed treatments upon its passage through the device 400.

The average residence time of the liquid food product in each of the reservoirs 404, 406, 408, 414, 416, 418 should be less than about 1 minute, and will preferably be less than about 5 seconds. The velocity of the food product through the orifices may be adjusted to provide the desired treatment time within a high voltage gradient electric field.

For example, the fluid food product may be forced under pressure at a velocity of about 100 meters per second through the slot-like orifices having a length in the direction of fluid travel of about 0.1 cm. to provide a treatment time of about 10 microseconds. The applied voltage between respective electrode reservoir zones may be in the range of from about 1000 to about 2000 volts.

Figure 6:
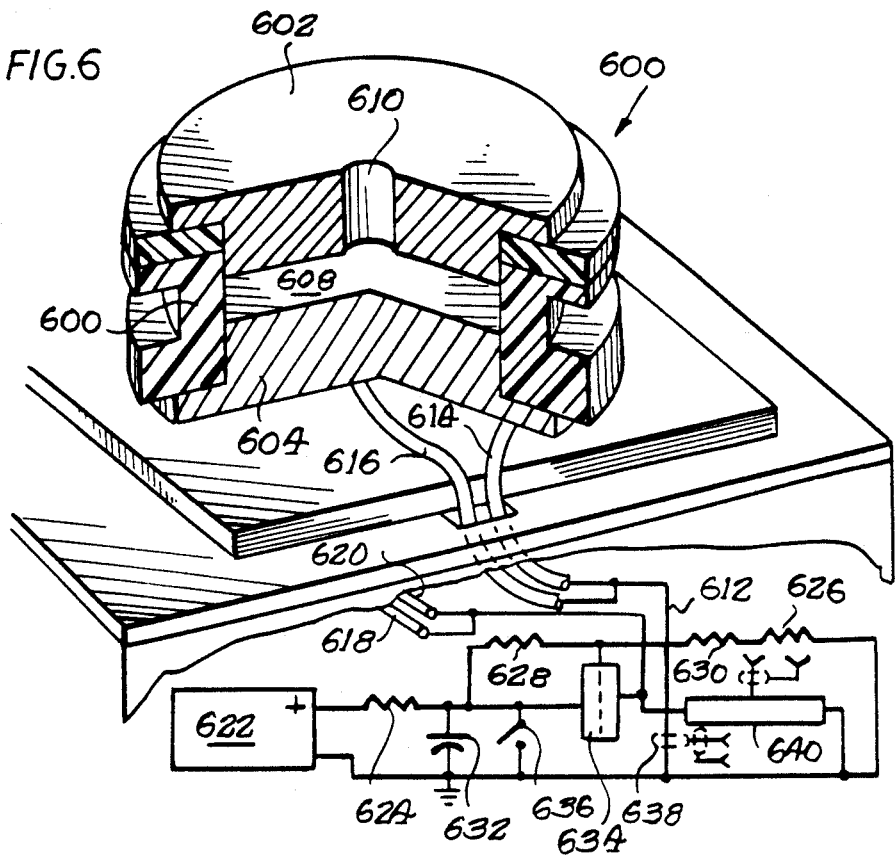
FIG. 6 is a perspective view, partially broken away, of an embodiment of a static pulsed electric field treatment cell for testing the effect of pulsed electric field treatment on perishable liquid food products, together with an electrical schematic diagram of the high voltage pulse generation circuitry for the test apparatus.

Having generally described the methods, apparatus and processing systems of FIGS. 1–5, various aspects of high voltage pulsed electric field treatment of specific liquid food products utilizing the laboratory scale pulsed electric field treatment apparatus of FIG. 6 will now be described. Illustrated in FIG. 6 is a pulsed electric field treatment static test apparatus 600 having two substantially parallel stainless steel electrodes 602, 604 which form a test chamber 608 with a cylindrical nylon spacer 606. The chamber 608 has a height of 2 cm. and an inner diameter of 10 cm. when capped on either end by the electrodes.

A liquid foodstuff to be treated may be inserted through a small hole 610 in one of the electrodes 602, 604 to completely fill the chamber 610. The illustrated electric pulser 612 comprises a high voltage power supply 622, two 400 kilohm resistors 624, 626, two 50 megohm resistors 628, 630, a bank 632 of six parallel connected 0.4 microfarad capacitors, a spark gap switch 634 and a dump relay 636, A current monitor 638 and a voltage probe 640 are also provided for monitoring the performance of the system. The electrical pulser 612 is attached to one electrode of the processing chamber with flexible cables 614, 616, and to the other electrode by means of cables 618, 620.

In operation, the filling aperture 610 of the chamber 608 is used for making temperature measurements. In this regard, approximately every five pulses, a thermometer is inserted into the chamber, the temperature is read, and then the chamber is topped off with sterile solution to compensate for the liquid removed by the insertion of the thermometer. Typically, the replacement liquid represents less than 1% of the total volume being treated.

Figure 7:
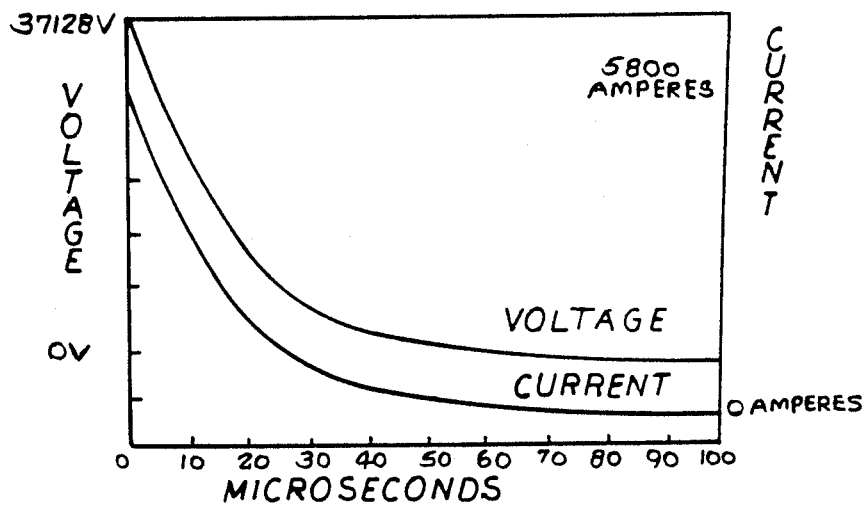
FIG. 7 is a graphic representation of an oscilloscope trace of voltage and current response through a liquid food product upon pulsed discharge of the apparatus of FIG. 6.

Upon discharge of the pulser 612, the chamber voltage waveform has a decaying exponential form with a waveform time constant given by the product of the processing chamber resistance and the power supply capacitance. Typical voltage and current waveforms for treatment of fluid milk are shown in FIG. 7, for a characteristic exponential decay time of about 20 microseconds. The corresponding "treatment time" is related to energy delivery time, and is therefore half of the RC delay. The treatment time defined in this manner is approximately 10 microseconds for the Example of FIG. 7.

The treatment time provided to a liquid food product by the apparatus 600 of FIG. 6, for a particular capacitance and initial voltage is a function of the resistance of the liquid food product being processed. The resistivity of food products can vary widely (e.g., from approximately 50 ohm-cm to several hundred ohm-cm). Moreover, the resistivity of a liquid food product will typically decrease with increased temperature, so that over a course of treatment during which the temperature of the liquid food product increases due to ohmic heating, the peak current will also increase and the treatment time will decrease. The increased current also can enhance deactivation.

The present invention has particular utility in respect to the preservation, decontamination or shelf-life extension of juices, juice concentrates or other fruit products which might contain contaminating microorganisms originating from or during the processing of the source fruit.

In this regard, a study of the effects of high voltage pulsed electric field treatment on a freshly produced, high pulp natural orange juice having a short shelf-life is carried out using the apparatus 600 of FIG. 6, which has an electrode area of 78 square centimeters and a height of 2 centimeters. A capacitance of 2.4 microfarads was utilized in the pulser 612.

A total of 35 high voltage pulses was applied to a 156 ml sample of orange juice purchased directly from a grocery store, having a naturally occurring mixture of microbiological contaminants. The microbiological population of the orange juice as purchased was a mixture of yeasts, molds and bacteria with many small slow growing colonies observed in platings. The treatment course is shown in Table 1. The voltage ranged from 33.6 kV to 35.7 kV over the course of 35 pulses, and the current increased from 5600 Amperes on the fifth pulse to 9000 Amperes on the thirty-second pulse. Thus, the impedance range for the processing chamber with the orange juice was 4 ohms to 6 ohms.

The impact of the treatment was very pronounced, with over 5 logs (base 10) of inactivation observed on the first day after treatment. As can be seen from FIG. 8, over a week of shelf-life extension was observed beyond the normal three day shelf-life. The orange juice was sampled after ten days and was found to be acceptable in terms of taste and odor. The untreated sample was found unacceptable after four days.

TABLE 1

High Pulp Orange Juice Electrical Treatment Given

| Pulse # | Peak Voltage | Peak Current (Amperes) | Resistance (Ohms) | Resistivity (Ohm - cm) | Temp. (°C.) |
|---|---|---|---|---|---|
| 1 | 33600 | | | | |
| 6 | 33600 | 5600 | 6.07 | 234 | |
| 8 | | | | | 42 |
| 11 | 34000 | 6400 | 5.31 | 207 | |
| 18 | 35700 | 8000 | 4.46 | 176 | |
| 19 | | | | | 49 |
| 22 | 35700 | 8000 | 4.46 | 176 | |
| 29 | 35700 | 8600 | 4.15 | 164 | |
| 30 | 35700 | 9000 | 3.97 | 157 | 65 |

For a given pulse, the peak electric field (in units of kV/cm) is determined by taking the peak voltage shown above and dividing by 2 cm. The area of the treatment chamber is 78 cm². The pulse duration ("RC time") is given by the product of the capacitance (2.4 microfarads) and the resistance.

The microbiological results obtained using treated and untreated (control) samples incubated at 9° C. (±2° C.) after treatment are given in Table 2. Colony counts were performed on samples serially diluted in sterile saline and plated on standard plate count agar medium by serial (1/10) dilutions performed with sterile saline solution (0.87 weight percent NaCl) as the diluent. Five 25 microliter droplets of each dilution were placed on one-half of a divided standard plate count agar plate (two dilutions per plate) and air dried at 36° C. prior to inverting the plate for incubation. Droplet colony counts were performed at 24–48 hours after plating. The counts for each of the 5 drops were averaged. The average obtained was multiplied by 40 times the dilution factor to obtain the original count/ml. Using this technique, the minimum detectable count is about 400/ml. Because of this sensitivity limit, occasional spread plates were prepared by plating 1 ml of undiluted sample and 0.5 ml of sample diluted 1/10 in order to observe residual organism numbers and initiation or regrowth.

TABLE 2

High Pulp Orange Juice Colony Counts After Electrical Treatment

| Time After Treatment (Hrs) | Untreated (CFU/ml) | Treated (CFU/ml) |
|---|---|---|
| 0 | $1.3 \times 10^6$ | 5 |
| 142.5 | $10^7$ | 5 |
| 199 | — | 32 |

TABLE 2-continued

High Pulp Orange Juice Colony Counts After Electrical Treatment

| Time After Treatment (Hrs) | Untreated (CFU/ml) | Treated (CFU/ml) |
|---|---|---|
| 241.5 (10 days) | — | $1.8 \times 10^4$ |

The present invention also has particular utility in the preservation, decontamination or shelf-life extension of milk, milk products and fluid foodstuffs derived from milk or milk products which might contain microbiological contaminants due to a milk background.

To determine the effect of pulsed electric field treatment on milk having a known quantity of specific microorganisms, a homogenized and pasteurized milk was purchased from a commercial source, and laboratory grown *Escherishia coli* ATCC strain 10536 was added prior to electrical discharge treatment at a cell concentration of $8.1 \times 10^6$ *E. coli* per ml. This sample was treated in the 156 ml. volume cylindrical treatment chamber of the apparatus 600 of FIG. 6, using six 0.4 uF capacitors connected in parallel, which were charged and then connected through the milk sample to ground via a spark gap switch. A sufficiently slow treatment rate was used to allow for sample cooling between discharges. The temperature of the spiked milk sample at the start of treatment was 13° C. The treatment history is given in Table 3.

TABLE 3

Treatment Course for Milk Seeded with *E. Coli*

| Pulse # | Temp. (°C.) | Peak Voltage | Peak Current (Amperes) |
|---|---|---|---|
| 1* | 17 | 28560 | 3700 |
| 2* | 21 | 37128 | 4900 |
| 3* | 23 | 39984 | 5600 |
| 4 | 25 | 42840 | 6000 |
| 5 | 27 | 42840 | 6300 |
| 8 | 34 | 42840 | |
| 10 | 32 | 42840 | 7000 |
| 12 | 36 | 42840 | 7200 |
| 18 | 39 | 42840 | |
| 19 | | 42840 | 8000 |
| 20 | 40 | 42840 | |
| 23 | 43 | 42840 | 8000 |

*These pulses used to test cell prior to 20 full voltage pulses

The resistance in ohms, at peak voltage and peak current conditions may be calculated for each pulse by dividing the voltage value by the current value. The corresponding resistivity value in ohm-cm may be calculated by multiplying this respective resistance value by a factor of 39 for the apparatus of FIG. 6.

The microbiological results obtained using treated and untreated (control samples are presented in Table 4. Colony counts were performed on samples serially diluted in sterile saline and plated on Standard Plate Count Agar medium (Difco), as previously described. The percentage kill immediately after treatment was 99.91%.

TABLE 4

| Time After Treatment (Hrs.) | Untreated (counts/ml) | Treated (counts/ml) |
|---|---|---|
| 0 | $8.1 \times 10^6$ | $7.4 \times 10^3$ |
| 19 | $7.6 \times 10^6$ | $5.8 \times 10^3$ |
| 45 | $9.1 \times 10^6$ | $3.6 \times 10^3$ |
| 95 (4 days) | $4.7 \times 10^7$ | $3.1 \times 10^3$ |

TABLE 4-continued

| Time After Treatment (Hrs.) | Untreated (counts/ml) | Treated (counts/ml) |
|---|---|---|
| 140 (5.8 days) | $6.2 \times 10^6$ | *$1.4 \times 10^5$ |

*This count represents a mixed population of *E. Coli* and milk bacteria and is therefore not directly comparable to the preceding numbers. It does, however, represent an upper limit.

A similar test run i carried out using milk seeded prior to treatment with a *Salmonella dublin* strain obtained through the California State Health Laboratory.

In this run, a homogenized and pasteurized milk seeded with 3800 *S. dublin* per milliliter is subjected to 40 high voltage discharges over a 25 minute time period, utilizing the test apparatus of FIG. 6, with the treatment parameters set forth in Table 5.

TABLE 5

Treatment of Milk Inoculated with *Salmonella dublin*

| Pulse # | Peak Voltage (kV) | Peak Current (kA) | Density (A/cm²) | Resistance (ohms) | Resistivity (ohm-cm²) | Temp. (°C.) |
|---|---|---|---|---|---|---|
| 1 | 36.7 | 6.2 | 79 | 5.9 | 230 | — |
| 5 | 36.7 | 7.0 | 90 | 5.3 | 207 | — |
| 10 | 37.6 | 8.4 | 107 | 4.4 | 172 | — |
| 20 | 36.7 | 9.0 | 115 | 4.1 | 160 | — |
| 30 | 36.7 | 10.0 | 128 | 3.7 | 144 | — |
| 40 | 36.7 | 11.0 | 141 | 3.3 | 129 | 63 |

Figure 9:
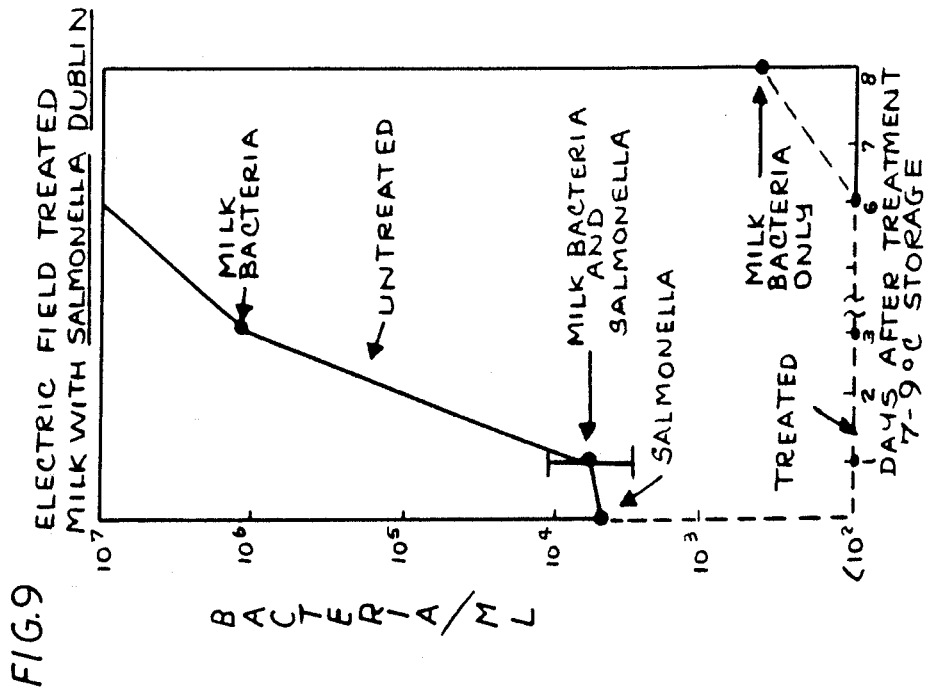
FIG. 9 is a graphic representation of the effect of pulsed electric field treatment on the microbiological content, over time, of fluid milk seeded with *Salmonella dublin* as compared to an untreated control sample.

The treated product is rapidly chilled to 7°–9° C. after treatment and stored at this temperature. It is periodically tested for microbiological content, as previously described. The treatment results are set forth graphically in FIG. 9, and in Table 6.

Immediately after treatment, the control count was 3,800 *S. dublin*, whereas the treated sample showed no *S. dublin* and less than 20 milk bacteria. In the shelf-life test, the samples were followed for a period of eight days. After one day, the control showed a mixture of milk bacteria and *S. dublin* with a total count of 4,600 per ml, while no *S. dublin* was seen in the treated sample. After 192 hours (8 days), the control sample showed substantial bacteria growth with a count greater than $10^7$ counts/ml. The treated sample, on the other hand, after eight days only had a bacteria count of approximately 400/ml and no *S. dublin* were observed during the entire period of the test. These results may suggest that the deactivation from the pulsed electric field treatment process is selective and the *S. dublin* are preferentially deactivated over the milk bacteria.

In the case of the control (untreated sample), the milk bacteria outgrew the *S. dublin* so rapidly that the existence of *S. dublin* in the control was not observable after a three day period.

TABLE 6

| Time After Treatment (Hrs.) | Untreated (counts/ml) | Treated (counts/ml) |
|---|---|---|
| 0 | 3,800 S* | 20 B* |
| | | 0 S |
| 24 | 4,600 S + B | 6 B |
| 72 | $1.2 \times 10^6$ S + B | 100 B |
| 144 | $2.7 \times 10^7$ B | 100 B |
| 192 | $10^7$ B | 400 B |

*S = *Salmonella dublin*
B = Milk Bacteria
S + B = Mixed Population of *Salmonella dublin* and Milk bacteria Processing methods in accordance with the present invention are particularly effective in increasing the shelf-life of yogurt, which is a fermented dairy product typically fermented by a mixed lactic acid bacteria culture such as a mixture of *S. thermophilus* and *L. bulgaricus*. In this regard, a test run was carried out using a yogurt which was seeded with *Saccharomyces cerevisiae*. This test run indicated the possibility of using electric field processing to obtain semi-selective kill. Multi-log reductions in viability can be obtained for relatively large oval shaped yeast in yogurt, while cotreated *lactobacilli* (relatively small and cylindrically shaped) express significantly reduced losses in viability (metabolic factors may also play a role in this differential kill).

Table 7 presents the treatment course to which the yeast seeded yogurt sample was processed in the electrical discharge device 600 of FIG. 6.

TABLE 7

| Pulse # | Temp. (°C.) | Peak Voltage (Volts) | Peak Current (Amperes) |
| --- | --- | --- | --- |
| 1 | 23 | 24276 | 5600 |
| 2 | 24 | 35700 | |
| 3 | 26 | 35700 | |
| 4 | 27 | 35700 | |
| 5 | 28 | 35700 | 10,000 |
| 6 | — | 31416 | |
| 9 | 30 | 31416 | |
| 15 | 35 | 31416 | |
| 16 | — | 36414 | |
| 20 | 38 | 36414 | 11,800 |

The resistance in ohms, at peak voltage and peak current conditions may be calculated for each pulse by dividing the voltage value by the current value. The corresponding resistivity value in ohm-cm may be calculated by multiplying this respective resistance value by a factor of 39 for the apparatus of FIG. 6.

The treated product is rapidly cooled and stored at a temperature of 7°-9° C. The resultant treatment upon yeast and *lactobacilli* counts for treated samples are compared to untreated sample results in Table 8.

TABLE 8

| | | Effect of Electric Field on Yeast in Yogurt | | | |
| --- | --- | --- | --- | --- | --- |
| Time After Treatment (Hrs) | Stor. Temp. (°C.) | Yeast (count × $10^3$/ml) | | Lactobacillus (count × $10^6$/ml) | |
| | | Untreat | Treated | Untreat | Treated |
| 0 | 4 | 47 | <0.1 | 650 | 23 |
| 48 | 4 | 77 | <0.1 | 650 | 5 |
| 92 (3.9 day) | 4 | 68 | <0.1 | 650 | 6 |
| 143 (6 day) | 4 | 82 | <0.1 | — | — |
| 191 (8 day) | 20* | 39,000* | 40* | — | — |

*Room temperature storage after six days indicates that surviving yeast were present As indicated by Table 8, dramatic reduction in yeast viability was achieved, whereas, *lactobacilli* within the treated sample were affected to a lesser degree. Incubation at room temperature was begun after 6 days to increase the yeast growth rate to verify the existence of surviving yeast in the treated sample.

Shelf-life extension experiments for yogurt samples seeded with moderate levels of yeast are also performed using the test apparatus 600 of FIG. 6, following the course of treatment as set forth in Tables 9 and 10.

TABLE 9

| | Course of Treatment for Yogurt + Low Level of Yeast | | | | |
| --- | --- | --- | --- | --- | --- |
| Pulse # | Peak Voltage (Volts) | Peak Current (Amperes) | Resistance (Ohms) | Resistivity (Ohm - cm) | Temp. (°C.) |
| 1 | 35260 | 8,600 | 4.1 | 160 | |
| 2 | 37100 | 10,000 | 3.71 | 145 | |
| 4 | 33558 | 9,200 | 3.65 | 142 | |
| 8 | 33558 | 10,400 | 3.23 | 126 | |
| 17 | 33558 | 11,400 | 2.94 | 115 | |
| 40 | 33558 | 11,400 | 2.94 | 115 | 63 |

The results of the shelf-life study of the product treated in accordance with Table 9 are graphically illustrated in FIG. 10.

TABLE 10

| Pulse # | Peak Voltage (Volts) | Peak Current (Amperes) | Resistance (Ohms) | Resistivity (Ohm - cm) | Temp. (°C.) |
| --- | --- | --- | --- | --- | --- |
| 1 | 31416 | 7,800 | 4.03 | 157 | |
| 2 | 31416 | 8,000 | 3.9 | 152 | |
| 3 | 31416 | 8,200 | 3.83 | 149 | |
| 10 | 29988 | 9,400 | 3.19 | 124 | |
| 15 | 29988 | 9,400 | 3.19 | 124 | |
| 20 | 29988 | 10,400 | 2.88 | 112 | 55 |

The results of the shelf-like study of the product treated in accordance with Table 10 are graphically illustrated in FIG. 11.

As previously indicated, control of processing temperature in conjunction with electric field processing parameters may provided substantial shelf-like extension in accordance with the present invention.

This synergistic effect was demonstrated during electric field processing experiments employing low repetition rates. For example, milk seeded with *S. dublin* and treated under similar conditions of electric field at repetition rates of one discharge per minute were carried out at different processing temperatures. Samples which were maintained during treatment at less than 40° C. show variable low levels of kill (10% survival) immediately after treatment, whereas samples maintained at 50° C. during treatment show several orders of magnitude greater kill (0.01% survival). Untreated, control samples held at 50° C. for the time employed during pulsed electric field testing show substantially no loss of microbial viability. Thus, a synergism is shown which elevates the kill obtained during combined heat and electric field processing which exceeds that shown using either treatment alone.

Similarly, the temperature of incubation after treatment has an effect upon the long term response of microorganisms. For example, milk containing *Salmonella dublin*, treated under conditions of electric field producing moderate kills immediately after treatment, responded differently depending upon the incubation temperature after treatment as set forth in Table 11. Milk containing *Salmonella dublin* was treated with moderate levels of electric field at a peak temperature of about 40° C. Identical portions of the treated milk were then incubated at room temperatures (19°-22° C.) or refrigerator temperatures (4° C.) as were portions of the same milk not treated with electric field. Colony forming ability on standard plate count agar at several times after treatment is given in Table 11.

TABLE 11

| Effect of Temperature After Electric Field Treatment | | | | |
|---|---|---|---|---|
| Time After | Counts ($\times 10^3$)/ml | | | |
| Treatment | Storage at 4° C. | | Storage at 19-22° C. | |
| (Hours) | Untreated | Treated | Untreated | Treated |
| 0 | 4.1 | 1.4 | 5.2 | 1.4 |
| 3 | 5.4 | 1.4 | 18 | 2.7 |
| 22 | 46 | 1.0 | 98,000 | 120,000 |
| 46 | 260 | 0.96 | TNTC* | TNTC* |

*Too numerous to count

The effect of control of processing temperature is also dramatic for yogurt which has been seeded with yeast. The results of peak temperature of 45° C. and 55° C. versus shelf-life are shown in FIG. 12. The shelf-life extension was ten days for a 45° C. peak and greater than one month for 55° C.

The above measurements show the efficacy of the synergism of heat and electric field on the reduction, both short term and long term of microbiological viability ("shelf-life"). In particular, the data demonstrates that the combined effect is substantially greater than the effect of heat or electric field alone.

The methods of the present invention also find particular utility in the preservation of fluid egg products which in untreated form have particularly limited shelf life and may naturally be subject to *Salmonella dublin* contamination. A series of food preservation tests using high voltage pulsed electric field treatment are carried out on fluid egg samples using the test apparatus 600 of FIG. 6. The tests are carried out on a fluid whole egg product from which a portion of the yolk is removed, to determine the relative preservation effect of pasteurization, addition of chemical preservatives, or "additives" (potassium sorbate and citric acid), and electric field treatment of unpasturized liquid egg product, pasteurized liquid egg product, and pasteurized egg product containing chemical preservatives. The electric field treatment temperature is also examined.

A first test is carried out in which the fluid egg sample temperature during pulsed electrical treatment is kept less than 50° C. The egg sample is unpasteurized and does not contain chemical preservatives. The treatment parameters including peak voltage and peak current values are set forth in the following Table 12.

TABLE 12

| Unpasteurized Fluid Egg Product | | | | | |
|---|---|---|---|---|---|
| Pulse # | Peak Voltage (Volts) | Peak Current (Amperes) | Resistance (Ohms) | Resistivity (Ohm - cm) | Temp. (°C.) |
| 3 | 36312 | 9000 | 4 | 156 | 26 |
| 13 | 34176 | 10800 | 3.16 | 123 | |
| 18 | 34888 | 11600 | 3.01 | 117 | |
| 20 | — | — | — | — | 41 |
| 23 | 34888 | 10400 | 3.35 | 131 | |
| 25 | — | — | — | — | 46 |

In this test run, in order to maintain temperature control, a five minute waiting period occurred after the twentieth pulse.

A liquid egg product sample which has previously been subjected to pasteurization heat treatment conditions is also subjected to pulsed electric field treatment. The treatment parameters are set forth in the following Table 13.

TABLE 13

| Pasteurized Fluid Egg Product | | | | | |
|---|---|---|---|---|---|
| Pulse # | Peak Voltage (Volts) | Peak Current (Amperes) | Resistance (Ohms) | Resistivity (Ohm - cm) | Temp. (°C.) |
| 1 | 36312 | 7200 | 5 | 195 | 18 |
| 6 | 36312 | 9200 | 3.95 | 154 | |
| 10 | 36312 | 9600 | 3.78 | 147 | |
| 15 | 36312 | 10400 | 3.45 | 135 | 45 |
| 26 | 36312 | 10800 | 3.36 | 131 | |

A five minute rest period was similarly initiated after the twentieth pulse in the treatment described in Table 13.

An unpasteurized liquid egg product which contains preservative amounts of potassium sorbate and citric acid ("additives") is also subjected to pulsed electric field treatment. The treatment parameters are set forth in Table 14.

TABLE 14

| Unpasteurized Fluid Egg Containing Additives | | | | | |
|---|---|---|---|---|---|
| Pulse # | Peak Voltage (Volts) | Peak Current (Amperes) | Resistance (Ohms) | Resistivity (Ohm - cm) | Temp. (°C.) |
| 1 | 35600 | 8400 | 4.24 | 165 | 24 |
| 5 | 35600 | 10000 | 3.56 | 139 | |
| 10 | 35600 | 11200 | 3.18 | 124 | |
| 15 | 35600 | 12000 | 2.97 | 116 | 50 |
| 20 | 35600 | 12000 | 2.97 | 116 | |
| 25 | 35600 | 12400 | 2.87 | 112 | 50 |

After 15 pulses and after 20 pulses, a 5 minute test period was initiated to maintain temperature control.

A pasteurized liquid egg product sample containing potassium sorbate and citric acid ("additives") is also subjected to pulsed electric field heat treatment. The treatment parameters are set forth in Table 15.

TABLE 15

| Pasteurized Fluid Egg Product Containing Additives | | | | | |
|---|---|---|---|---|---|
| Pulse # | Peak Voltage (Volts) | Peak Current (Amperes) | Resistance (Ohms) | Resistivity (Ohm - cm) | Temp. (°C.) |
| 1 | 34888 | 8000 | 4.36 | 170 | 21 |
| 6 | 35600 | 9600 | 3.71 | 145 | |
| 10 | 35600 | 10400 | 3.42 | 133 | |
| 15 | 35600 | 11600 | 3.07 | 120 | 47 |
| 20 | 34888 | 1200 | 2.91 | 113 | |
| 25 | — | — | — | — | 47 |

After 15 and 20 pulses, a five minute rest period was initiated to maintain temperature control.

A pasteurized fluid egg sample containing additives is also subjected to pulsed electric field treatment, while permitting the temperature to rise to approximately 60° C. The test parameters are set forth in Table 16.

TABLE 16

| Pasteurized Fluid Egg Product Containing Additives at Elevated Treatment Temperature | | | | | |
|---|---|---|---|---|---|
| Pulse # | Peak Voltage (Volts) | Peak Current (Amperes) | Resistance (Ohms) | Resistivity (Ohm - cm) | Temp. (°C.) |
| 1 | 38448 | 9600 | 4.01 | 156 | |
| 5 | 37736 | 10400 | 3.63 | 142 | |
| 10 | 37024 | 12200 | 3.03 | 118 | |
| 15 | 37024 | 13600 | 2.72 | 106 | |
| 20 | 37024 | 14200 | 2.61 | 102 | |
| 21 | 37024 | 13000 | 2.85 | 111 | |
| 25 | 37024 | 13800 | 2.68 | 105 | |

TABLE 16-continued

| | Pasteurized Fluid Egg Product Containing Additives at Elevated Treatment Temperature | | | | |
|---|---|---|---|---|---|
| Pulse # | Peak Voltage (Volts) | Peak Current (Amperes) | Resistance (Ohms) | Resistivity (Ohm - cm) | Temp. (°C.) |
| 30 | 36312 | 14000 | 2.60 | 101 | 58 |

Portions of the electrically treated samples are subsequently immediately stored at about 4° C. and about 10° C., respectively, and are periodically tested for microbiological count as previously discussed to examine the shelf-life of the product. The results of the shelf life tests are graphically illustrated in FIGS. 13–17.

The first six graphs (FIGS. 13–16) show the log-counts (base 10) of the bacterial population for pasteurized and unpasteurized samples of the fluid egg product, with and without chemical additives. Data are presented for storage at both 4° C. and 10° C.

In FIG. 13, line 1300 represents the log bacteria count data for the pasteurized control product stored at 10° C. while line 1302 represents the data for the pasteurized control product stored at 4° C. Line 1304 represents the data for the electric field treated pasteurized fluid egg product with chemical additives, which was stored at about 10° C. following pulsed electric field treatment. Line 1306 similarly represents the data for the electric field treated pasteurized fluid egg product with chemical additives, which was stored at about 4° C. following pulsed electric field treatment.

FIG. 14 presents the shelf-life test data for unpasteurized and pasteurized fluid egg product with additives at 4° C. Line 1400 presents the storage data for the unpasteurized control sample with additives, but without pulsed electric field treatment, while line 1402 similarly presents the storage data for the pasteurized control sample with additives which was not subjected to pulsed electric field treatment. Line 1404 presents the data for the unpasteurized additive containing product which was subjected to pulsed electric field treatment while line 1406 presents the storage data for the pasteurized additive containing product which was subjected to pulsed electric field treatment. The data similarly demonstrates the substantial increase in shelf-life provided by the pulsed electric field treatment.

Similarly, FIG. 15 presents the data comparing the unpasteurized and pasteurized fluid egg product at the 4° C. storage temperature. Lines 1500 and 1502, respectively, present the storage data for the unpasteurized and pasteurized control samples. Lines 1504 and 1506, respectively, show the microbiological shelf-life extension provided to the unpasteurized egg product and the pasteurized egg product which were subjected to pulsed electric field treatment.

FIG. 16 similarly presents microbiological storage data for unpasteurized and pasteurized fluid egg product with additives at a storage temperature of about 10° C. Lines 1600 and 1602, respectively, present the data for the unpasteurized and pasteurized control samples with additives. Lines 1604 and 1606, respectively, present the corresponding data for the unpasteurized egg product containing additives and the pasteurized egg product containing additives which were subjected to pulsed electric field treatment.

FIG. 17 shows the counts over a 28 day period with the temperature of the sample during treatment elevated to approximately 60° C. (Table 16). Lines 1700 and 1702, respectively, present the data for the pasteurized fluid egg product control sample containing additives at respective storage temperatures of 10° C. and 4° C. Line 1704 presents the improvement provided to the pasteurized fluid egg product with additives by pulsed electric field treatment at an elevated treatment temperature, while line 1706 presents the data for the pasteurized fluid egg product with additives subjected to pulsed electric field treatment at the elevated treatment temperature and subsequently stored at a temperature of about 4° C. The shelf-life extension demonstrated in line 1706 represents a remarkable shelf-life extension. In fact, no counts were observed at all by the standard plate-count method, indicating less than 400/cm$^3$. Counts eventually were detected with the more sensitive spread plate measurement.

These results demonstrate significant shelf-life extension provided by pulsed electric field treatment. The test data of the sample of Table 16 further demonstrate significant extension of shelf-life by providing elevated temperature pulsed electric field treatment. The treatment provides an increase in shelf-life to over 28 days at 4° C. storage. The psychrophile and mesophile counts were below the plate count detection threshold of about 400/cm$^3$ for over 28 days. Using a spread plate, 100/cm$^3$ mesophile count was detected at day 18, reaching 200/cm$^3$ at day 28. The psychrophile count is believed to be of the order of or less than mesophile count, at less than 400/cm$^3$ at day 28. The sample is split on day 25 into two parts and the storage temperature of one part was to 12° C., the count went from 200 to 10 $^5$ counts in three days (day 28), demonstrating that the media is a viable nutrient for the remaining mesophiles. These results are similar to the long shelf-life extension previously described with respect to pulsed electric field current treatment of yogurt. No *Salmonella dublin* were observed in any pulsed electric field treated samples of the fluid egg product, but were observed in unpasteurized samples (with and without chemical additives). These results are consistent with pulsed electric field treatment of raw milk seeded with *Salmonella dublin* as previously described.

Accordingly, it will be appreciated that improved methods and apparatus for the preservation of fluid foodstuffs such as dairy products, fruit juices and liquid egg products have been provided in accordance with the present disclosure.

While the present invention has been particularly described with reference to specific embodiments, it will be appreciated that various modifications and adaptations will be apparent from the present disclosure which are intended to be included within the scope of the accompanying claims.

What is claimed is:

1. Pulsed field treatment apparatus for preservation of fluid foodstuffs comprising an electric field treatment chamber comprising a first electrode means for making electrical contact with fluid foodstuff disposed adjacent said first electrode means in said chamber, a second electrode means spaced apart from said first electrode means for making electrical contact with fluid foodstuff disposed in said chamber between said first electrode means and said second electrode means, an inlet conduit means for introducing a fluid foodstuff to be treated into said electric field treatment chamber, heating means for providing said fluid foodstuff at a treatment temperature of at least about 45° C. in said treatment chamber, an outlet conduit means for discharging said fluid foodstuff which has passed through said treatment chamber, electric pulse generating means for applying high voltage electrical pulses to said first and second electrode means at a rate of at least about one pulse per minute to provide a substantially uniform electric field between said electrodes through a fluid foodstuff located therebetween of at least about 5,000 volts per centimeter, said electrodes and said electric pulse generating means cooperating to provide a substantially uniform electric field free of current filaments through said fluid foodstuff in said treatment chamber, and means for pumping a fluid foodstuff in said treatment chamber, and means for pumping a fluid foodstuff through said inlet conduit means at a rate such that all of said fluid foodstuff is subjected to a least two of said high voltage pulses in transit through said high voltage treatment zone before it is conducted from the chamber through said outlet conduit means.

2. Apparatus in accordance with claim 1 wherein said high voltage electrical pulse applying means provides high voltage electrical pulses to said first and second electrode means at a rate of at least about one pulse per second, wherein said heating means comprises means for heating the fluid foodstuff to a predetermined temperature of at least about 45° C. before introduction through said treatment chamber, and further comprising cooling means for cooling the fluid foodstuff which has passed through said treatment chamber to a refrigeration temperature in the range of from about 0° to about 10° C.

3. Apparatus in accordance with claim 1 wherein at least one of said first and second electrode means comprises an electrically conductive electrode for application of a pulsed electrical current from said electric pulse generating means, an ion permeable membrane for contacting said fluid foodstuff, and an ionic electrolyte positioned intermediate said electrically conductive electrode and said ion permeable membrane.

4. Electric field treatment apparatus for preserving a fluid foodstuff comprising means defining a first electrode reservoir zone, means defining a second electrode reservoir zone, means defining a restrictive orifice between said first reservoir zone and said second reservoir zone, means for continuously conducting an electric current in fluid foodstuff between said first reservoir zone and said second reservoir zone and through said restrictive orifice to provide an electric field gradient in said restrictive orifice of at least about 5,000 volts per centimeter, pumping means for forcing fluid foodstuff from said first electrode reservoir zone through said restrictive orifice into said second reservoir zone at a rate which provides an effective pulsed field treatment time in said restrictive orifice of at least about 1 microsecond, and heating means for providing said fluid foodstuff forced through said restrictive orifice at a temperature of at least about 45° C.

5. Apparatus in accordance with claim 4 wherein said means for forcing fluid foodstuff from said first electrode reservoir zone through said restrictive orifice into said reservoir zone provides an effective pulsed electric treatment time in said restrictive orifice in the range of from about 5 to about 100 microseconds.

6. Apparatus in accordance with claim 4 wherein said electrode means comprises an electrically conductive electrode, an ion permeable membrane for contacting said fluid foodstuff, and an aqueous ionic electrolyte positioned intermediate said electrically conductive electrode and said ion permeable membrane.

7. Apparatus in accordance with claim 4 further comprising cooling means for cooling the fluid foodstuff which has passed through said restrictive orifice to a refrigeration temperature in the range of from about 0° to about 10° C.

* * * * *

UNITED STATES PATENT AND TRADEMARK OFFICE
CERTIFICATE OF CORRECTION

PATENT NO. : 4,838,154          Page 1 of 2
DATED : June 13, 1989
INVENTOR(S) : Joseph E. Dunn et al.

It is certified that error appears in the above-indentified patent and that said Letters Patent is hereby corrected as shown below:

On the title page, item [57]
at line 2, change "diary" to --dairy--

Figure 8:
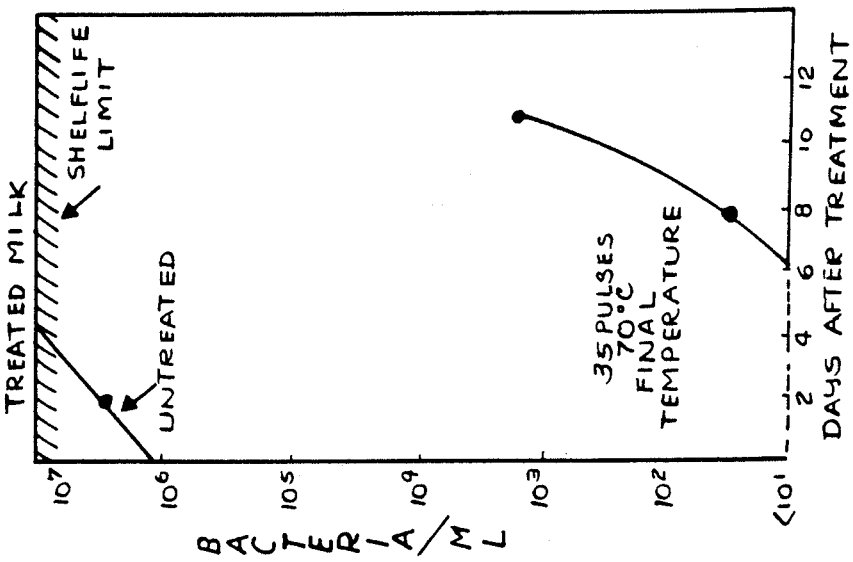
FIG. 8 is a graphic representation of the shelf-life extension provided by pulsed electric field treatment of natural, high pulp orange juice.

In FIG. 6, change the reference numeral for the cylindrical nylon spacer "600" to --606--.
In FIG. 8 change the legend "ELECTRIC FIELD TREATED MILK" to --ELECTRIC FIELD TREATED HIGH PULP NATURAL ORANGE JUICE--.

Column 4, line 12, after "for" insert --preserving--.
Column 5, line 26, after "and" insert --each--.
Column 13, line 40, after "particularly" insert --at higher--.
Column 14, line 4, change "FIG. 4 the" to --FIG. 4. The--.
Column 14, line 11, change "to" to --the--.
Column 18, line 9, after "run" change "i" to --is--.

UNITED STATES PATENT AND TRADEMARK OFFICE
CERTIFICATE OF CORRECTION

PATENT NO. : 4,838,154
DATED : June 13, 1989
INVENTOR(S) : Joseph E. Dunn et al.

It is certified that error appears in the above-indentified patent and that said Letters Patent is hereby corrected as shown below:

Column 20, line 29, change "shelf-like" to --shelf-life--.
Column 20, line 34, change "provided" to --provide--.
Column 20, line 34, change "shelf-like" to --shelf-life--.
Column 21, line 15, change "temperature" to --temperatures--.
Column 21, line 38, change "unpasturized" to --unpasteurized--.
Column 21, line 44, after "The" insert --fluid--.
Column 24, line 31, after "was" insert --increased--.
Column 24, line 33, after "remaining" insert --few--.

Signed and Sealed this

Eighth Day of April, 1997

Attest:

BRUCE LEHMAN

Attesting Officer  Commissioner of Patents and Trademarks